(12) United States Patent
Colligan et al.

(10) Patent No.: US 8,504,074 B2
(45) Date of Patent: *Aug. 6, 2013

(54) SYSTEM AND METHOD FOR PROVIDING ADVERTISEMENT DATA TO A MOBILE COMPUTING DEVICE

(75) Inventors: Edward T. Colligan, San Jose, CA (US); Sachin S. Kansal, Sunnyvale, CA (US); David D. Daetz, Cupertino, CA (US); David Z. Creemer, Palo Alto, CA (US); David Vadasz, Los Altos, CA (US); Bernard P. Cousineau, Burlingame, CA (US); Matias G. Duarte, Sunnyvale, CA (US)

(73) Assignee: Palm, Inc., Sunnyvale, CA (US)

( * ) Notice: Subject to any disclaimer, the term of this patent is extended or adjusted under 35 U.S.C. 154(b) by 465 days.

This patent is subject to a terminal disclaimer.

(21) Appl. No.: 12/324,694

(22) Filed: Nov. 26, 2008

(65) Prior Publication Data

US 2009/0197619 A1    Aug. 6, 2009

Related U.S. Application Data

(63) Continuation-in-part of application No. 11/901,272, filed on Sep. 14, 2007, and a continuation-in-part of application No. 11/449,001, filed on Jun. 6, 2006, now Pat. No. 7,536,190, which is a continuation of application No. 10/917,182, filed on Aug. 11, 2004, now Pat. No. 7,103,370, which is a continuation of application No. 09/755,784, filed on Jan. 5, 2001, now Pat. No. 6,795,710.

(51) Int. Cl.
H04W 24/00 (2009.01)
H04W 4/00 (2009.01)
H04M 3/42 (2006.01)
H04B 1/034 (2006.01)
G06F 15/16 (2006.01)
G06F 15/173 (2006.01)
G06F 1/26 (2006.01)
G06F 1/00 (2006.01)
G06F 3/00 (2006.01)
G06F 3/048 (2013.01)

(52) U.S. Cl.
USPC ............. 455/456.3; 455/414.1; 455/414.2; 455/435.1; 455/456.1; 455/456.2; 455/466; 455/99; 709/203; 709/217; 709/218; 709/219; 709/226; 713/320; 713/323; 715/700; 715/744; 715/790; 715/854

(58) Field of Classification Search
USPC .................... 455/456.3, 404.2, 558
See application file for complete search history.

(56) References Cited

U.S. PATENT DOCUMENTS 4,779,081 A   10/1988   Nakayama et al.
4,788,675 A   11/1988   Jones et al.
(Continued)

FOREIGN PATENT DOCUMENTS

DE   10228608 A1   1/2004
EP   1 220 552 A1   7/2002
(Continued)

OTHER PUBLICATIONS

U.S. Appl. No. 12/324,678, filed Nov. 26, 2008, Colligan et al.
(Continued)

*Primary Examiner* — Timothy Pham

(57) ABSTRACT

A mobile device includes a processor and a memory coupled to the processor and configured to store user-specific data. The processor is configured to access data indicating a position of the mobile device and provide advertisement data based upon the position of the mobile device and the user-specific data.

24 Claims, 13 Drawing Sheets

U.S. PATENT DOCUMENTS

| | | | |
|---|---|---|---|
| 5,134,719 A | 7/1992 | Mankovitz | |
| 5,303,393 A | 4/1994 | Noreen et al. | |
| 6,000,000 A | 12/1999 | Hawkins et al. | |
| 6,009,409 A | 12/1999 | Adler et al. | |
| 6,011,976 A | 1/2000 | Michaels et al. | |
| 6,073,075 A * | 6/2000 | Kondou et al. | 701/203 |
| 6,108,727 A | 8/2000 | Boals et al. | |
| 6,141,010 A | 10/2000 | Hoyle | |
| 6,157,814 A | 12/2000 | Hymel et al. | |
| 6,182,010 B1 | 1/2001 | Berstis | |
| 6,216,112 B1 | 4/2001 | Fuller et al. | |
| 6,253,326 B1 | 6/2001 | Lincke et al. | |
| 6,259,405 B1 | 7/2001 | Stewart et al. | |
| 6,300,946 B1 | 10/2001 | Lincke et al. | |
| 6,310,955 B1 | 10/2001 | Reeves | |
| 6,343,317 B1 | 1/2002 | Glorikian | |
| 6,343,318 B1 | 1/2002 | Hawkins et al. | |
| 6,359,571 B1 | 3/2002 | Endo et al. | |
| 6,360,272 B1 | 3/2002 | Lincke et al. | |
| 6,397,246 B1 | 5/2002 | Wolfe | |
| 6,397,259 B1 | 5/2002 | Lincke et al. | |
| 6,425,087 B1 | 7/2002 | Osborn et al. | |
| 6,430,603 B2 | 8/2002 | Hunter | |
| 6,452,498 B2 | 9/2002 | Stewart | |
| 6,453,371 B1 | 9/2002 | Hampson et al. | |
| 6,456,234 B1 | 9/2002 | Johnson | |
| 6,457,134 B1 | 9/2002 | Lemke et al. | |
| 6,484,033 B2 | 11/2002 | Murray | |
| 6,493,327 B1 | 12/2002 | Fingerhut | |
| 6,502,033 B1 * | 12/2002 | Phuyal | 701/445 |
| 6,523,124 B1 | 2/2003 | Lunsford et al. | |
| 6,526,268 B1 | 2/2003 | Marrah et al. | |
| 6,529,159 B1 | 3/2003 | Fan et al. | |
| 6,545,596 B1 * | 4/2003 | Moon | 340/425.5 |
| 6,546,257 B1 | 4/2003 | Stewart | |
| 6,560,640 B2 | 5/2003 | Smethers | |
| 6,571,279 B1 | 5/2003 | Herz et al. | |
| 6,581,025 B2 | 6/2003 | Lehman | |
| 6,590,588 B2 | 7/2003 | Lincke et al. | |
| 6,591,288 B1 | 7/2003 | Edwards et al. | |
| 6,628,928 B1 | 9/2003 | Crosby et al. | |
| 6,647,257 B2 | 11/2003 | Owensby | |
| 6,650,902 B1 | 11/2003 | Richton | |
| 6,675,165 B1 | 1/2004 | Rothschild | |
| 6,675,202 B1 | 1/2004 | Perttunen | |
| 6,675,204 B2 | 1/2004 | De Boor et al. | |
| 6,694,428 B2 | 2/2004 | Lemke et al. | |
| 6,701,521 B1 | 3/2004 | McLlroy et al. | |
| 6,782,253 B1 | 8/2004 | Shteyn et al. | |
| 6,795,710 B1 | 9/2004 | Creemer | |
| 6,816,725 B1 | 11/2004 | Lemke et al. | |
| 6,829,560 B2 | 12/2004 | Lehman | |
| 6,847,969 B1 | 1/2005 | Mathai et al. | |
| 6,871,140 B1 * | 3/2005 | Florance et al. | 701/516 |
| 6,880,048 B1 | 4/2005 | Lemke | |
| 6,917,976 B1 * | 7/2005 | Slaughter et al. | 709/226 |
| 6,944,443 B2 | 9/2005 | Bates et al. | |
| 6,961,567 B1 | 11/2005 | Kuhn | |
| 7,024,464 B1 | 4/2006 | Lusher et al. | |
| 7,089,264 B1 | 8/2006 | Guido et al. | |
| 7,103,370 B1 | 9/2006 | Creemer | |
| 7,266,379 B2 | 9/2007 | Blight et al. | |
| 7,343,564 B2 | 3/2008 | Othmer | |
| 7,360,248 B1 | 4/2008 | Kanevsky et al. | |
| 7,424,447 B2 | 9/2008 | Fuzell-Casey et al. | |
| 7,536,190 B1 | 5/2009 | Creemer | |
| 2001/0032121 A1 * | 10/2001 | Le | 705/14 |
| 2001/0044310 A1 | 11/2001 | Lincke | |
| 2001/0047272 A1 | 11/2001 | Frietas et al. | |
| 2002/0052781 A1 * | 5/2002 | Aufricht et al. | 705/14 |
| 2002/0069093 A1 | 6/2002 | Stanfield | |
| 2002/0077084 A1 * | 6/2002 | Zellner et al. | 455/414 |
| 2002/0077118 A1 | 6/2002 | Zellner et al. | |
| 2002/0087401 A1 * | 7/2002 | Leapman et al. | 705/14 |
| 2002/0103693 A1 | 8/2002 | Bayer et al. | |
| 2002/0164962 A1 * | 11/2002 | Mankins et al. | 455/99 |
| 2003/0008661 A1 | 1/2003 | Joyce et al. | |
| 2003/0050046 A1 | 3/2003 | Conneely et al. | |
| 2003/0060211 A1 | 3/2003 | Chern et al. | |
| 2003/0060214 A1 | 3/2003 | Hendrey et al. | |
| 2003/0159109 A1 | 8/2003 | Rossmann et al. | |
| 2004/0127198 A1 | 7/2004 | Roskind et al. | |
| 2005/0245241 A1 | 11/2005 | Durand et al. | |
| 2006/0030306 A1 | 2/2006 | Kuhn | |
| 2006/0036490 A1 | 2/2006 | Sagalyn | |
| 2006/0041472 A1 | 2/2006 | Lukose et al. | |
| 2006/0143083 A1 | 6/2006 | Wedeen | |
| 2006/0197781 A1 | 9/2006 | Arutunian | |
| 2006/0200308 A1 | 9/2006 | Arutunian | |
| 2006/0200311 A1 | 9/2006 | Arutunian et al. | |
| 2006/0200382 A1 | 9/2006 | Arutunian et al. | |
| 2006/0200383 A1 | 9/2006 | Arutunian et al. | |
| 2006/0200384 A1 | 9/2006 | Arutunian et al. | |
| 2007/0178899 A1 | 8/2007 | Kuhn | |
| 2007/0263863 A1 | 11/2007 | Sakhpara | |
| 2007/0271234 A1 | 11/2007 | Ravikiran | |
| 2008/0052413 A1 | 2/2008 | Wang et al. | |
| 2008/0059285 A1 | 3/2008 | Hamoui | |
| 2008/0132219 A1 | 6/2008 | Bisdikian et al. | |
| 2008/0160966 A1 | 7/2008 | Mckiou et al. | |
| 2008/0195457 A1 | 8/2008 | Sherman et al. | |
| 2009/0076906 A1 | 3/2009 | Kansal et al. | |

FOREIGN PATENT DOCUMENTS

| | | |
|---|---|---|
| EP | 1551193 A1 | 7/2005 |
| EP | 1063837 B1 | 10/2005 |
| EP | 1 631 050 | 6/2007 |
| WO | WO99/55066 A1 | 10/1999 |
| WO | WO01/65411 A1 | 9/2001 |
| WO | WO 2005-071932 A1 | 8/2005 |
| WO | WO 2006/099586 | 9/2006 |

OTHER PUBLICATIONS

U.S. Appl. No. 11/449,001, filed Jun. 6, 2006, Creemer.
U.S. Appl. No. 61/140,562, filed Dec. 23, 2008, Colligan et al.
U.S. Appl. No. 60/954,022, filed Aug. 6, 2007, Swift et al.
International Search Report for International Application No. PCT/US2001/06340; date mailed May 16, 2001; 1 page.
Office Action for U.S. Appl. No. 11/540,909, date mailed Nov. 17, 2008, 14 pages.
Office Action for U.S. Appl. No. 11/809,198, date mailed Oct. 24, 2008, 15 pages.
Protest for U.S. Appl. No. 09/794,082, filed Feb. 24, 2004, 5 pages.
Response to Office Action for U.S. Appl. No. 11/540,909, date mailed Apr. 16, 2009, 10 pages.
Response to Office Action for U.S. Appl. No. 11/809,198, date mailed Feb. 17, 2009, 11 pages.
International Search Report and Written Opinion for International Application No. PCT/US2009/064940, mail date May 13, 2010, 8 pages.
Office Action for U.S. Appl. No. 09/794,082, mail date May 16, 2008, 10 pages.
Office Action for U.S. Appl. No. 09/794,082, mail date Jan. 14, 2009, 9 pages.
Office Action for U.S. Appl. No. 09/794,082, mail date Jun. 25, 2009, 8 pages.
Office Action for U.S. Appl. No. 12/420,743, mail date May 7, 2010, 9 pages.
Office Action for U.S. Appl. No. 11/634,328, mail date Jun. 23, 2009; 8 pages.
International Search Report and Written Opinion for International Application No. PCT/US2009/068525, mail date Aug. 5, 2010, 8 pages.
Office Action for U.S. Appl. No. 11/901,272, mail date Aug. 10, 2010, 10 pages.

* cited by examiner

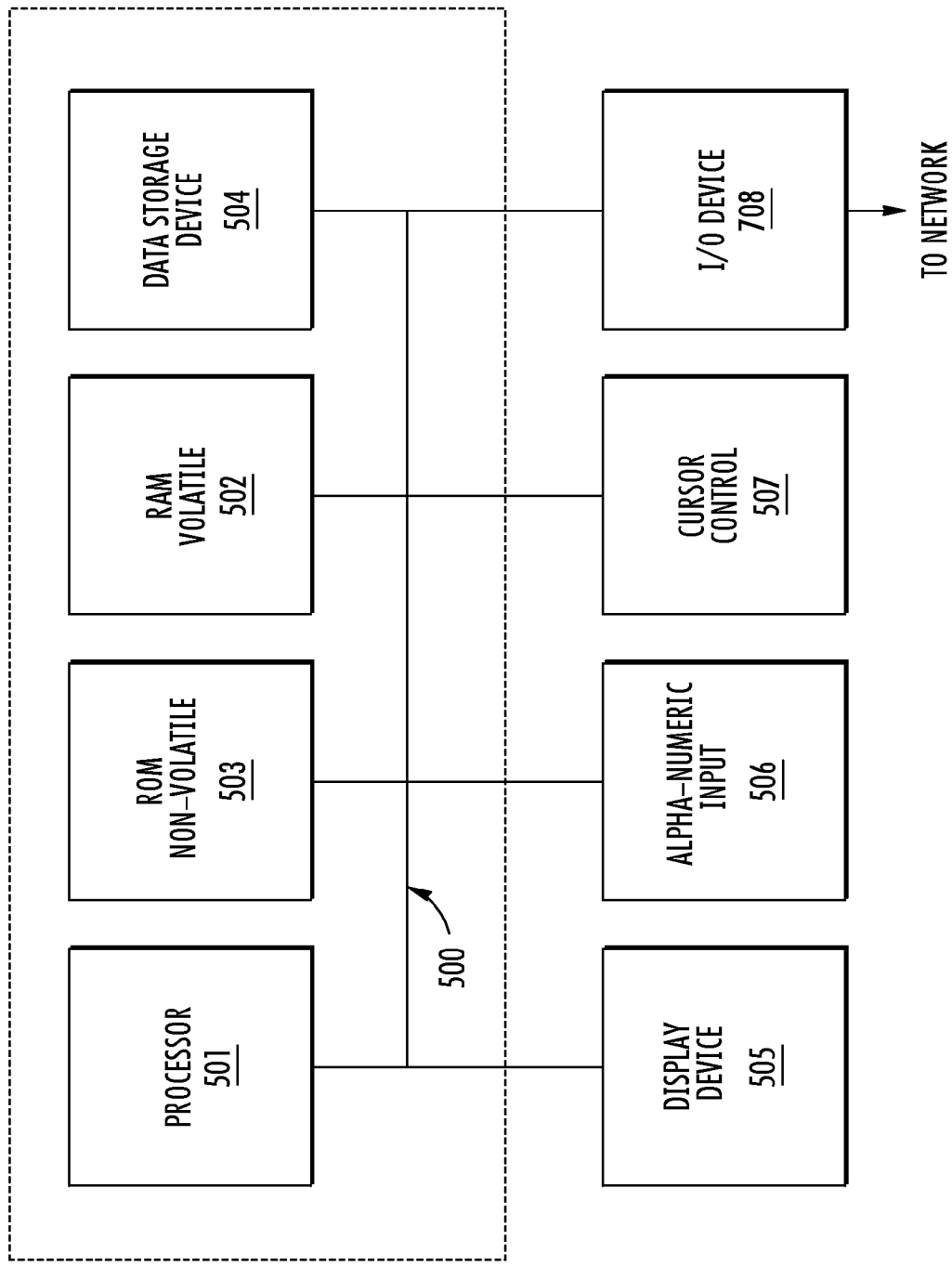

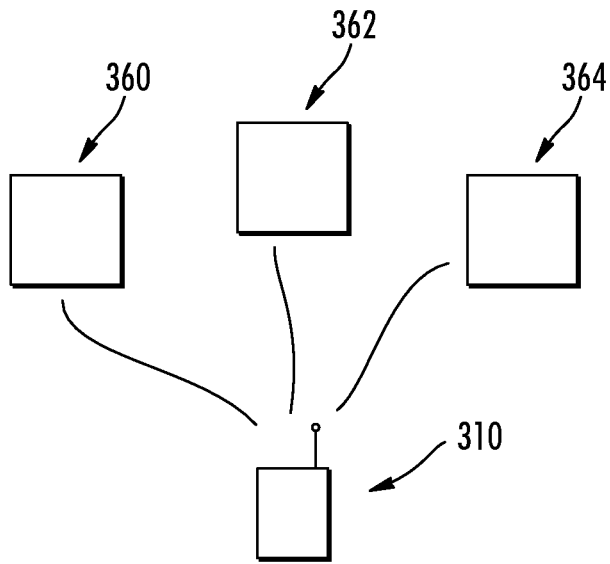
FIG. 14
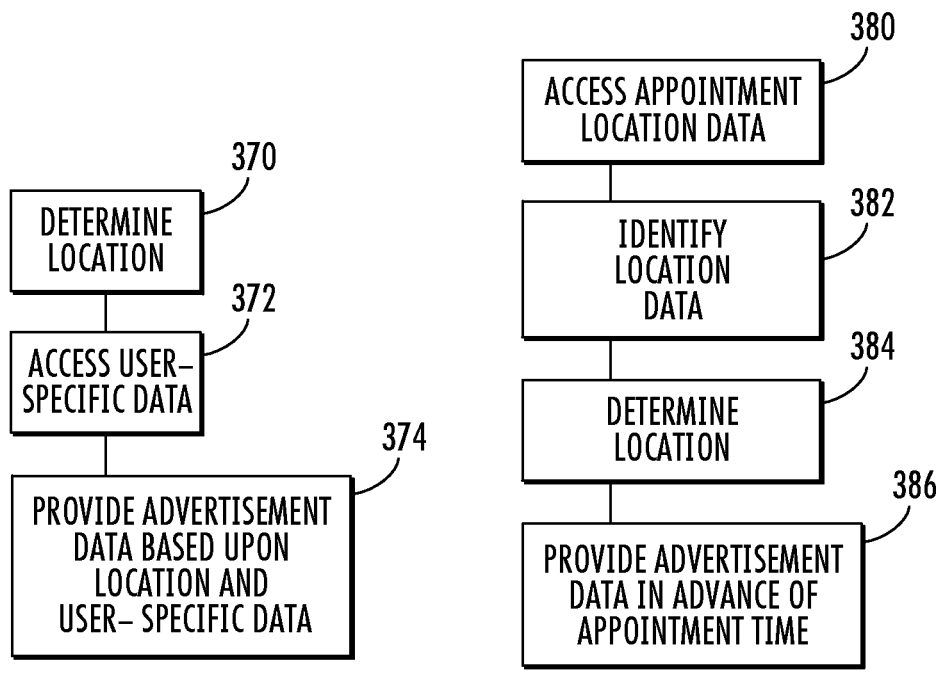
FIG. 15
FIG. 16

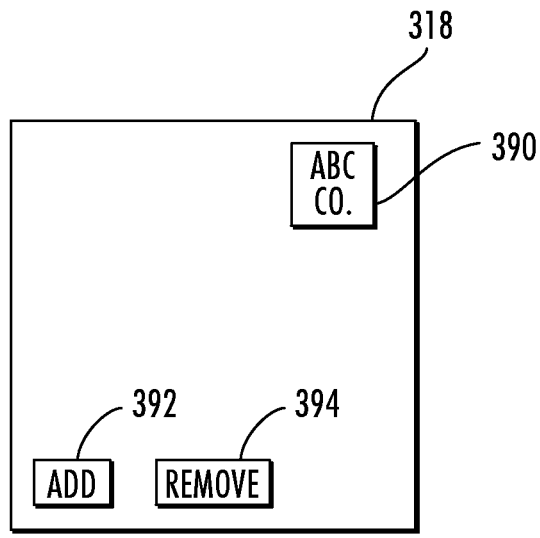
FIG. 17
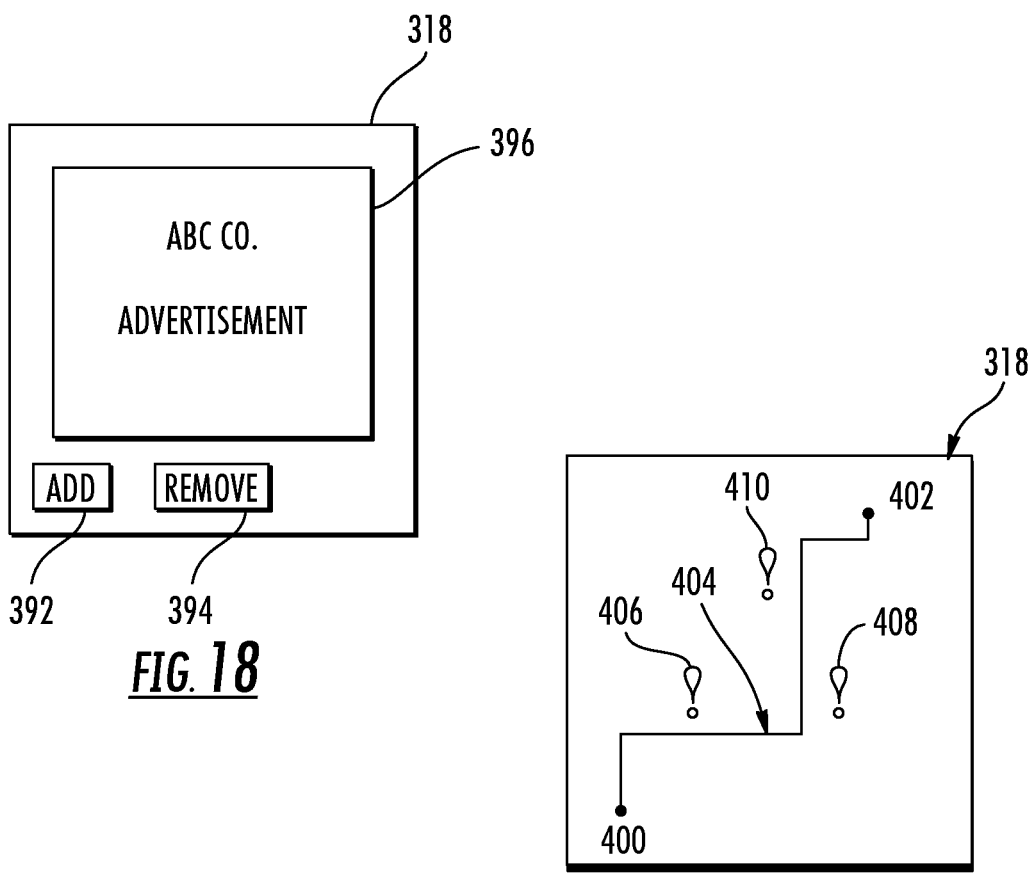
FIG. 18
FIG. 19

SYSTEM AND METHOD FOR PROVIDING ADVERTISEMENT DATA TO A MOBILE COMPUTING DEVICE

CROSS-REFERENCE TO RELATED PATENT APPLICATIONS

The present application is a continuation-in-part of U.S. application Ser. No. 11/901,272, filed Sep. 14, 2007. The present application is also a continuation-in-part of U.S. application Ser. No. 11/449,001, filed Jun. 6, 2006, which is a continuation of U.S. application Ser. No. 10/917,182, filed Aug. 11, 2004, now U.S. Pat. No. 7,103,370, which is a continuation of U.S. application Ser. No. 09/755,784, filed Jan. 5, 2001, now U.S. Pat. No. 6,795,710. All of these applications are incorporated by reference herein in their entireties.

BACKGROUND

The present disclosure relates generally to the field of mobile computing devices, and more specifically, to systems and methods for providing advertisement data to a mobile computing device.

The present disclosure also relates to the field of wireless transceiver devices. Specifically, to a method and systems for targeting services according to location-based information derived from a wireless transceiver device.

Mobile devices may be used to provide location-based advertisements to users of mobile devices. As a user travels, advertisements may be displayed on a mobile device the user is carrying based upon the geographic location of the mobile device. For example, if a user walks past a restaurant, an advertisement (e.g., coupon, discount, general advertisement, etc.) may be displayed on the user's mobile device.

However, with the increasing usage of mobile devices and location-based advertisements, users may receive numerous advertisements, where many may be totally irrelevant to the user, and where it may be difficult to identify relevant or useful advertisements because of the high number of advertisements being received.

BRIEF DESCRIPTION

FIG. 5B is a block diagram of one embodiment of a server computer system.

Figure 6:
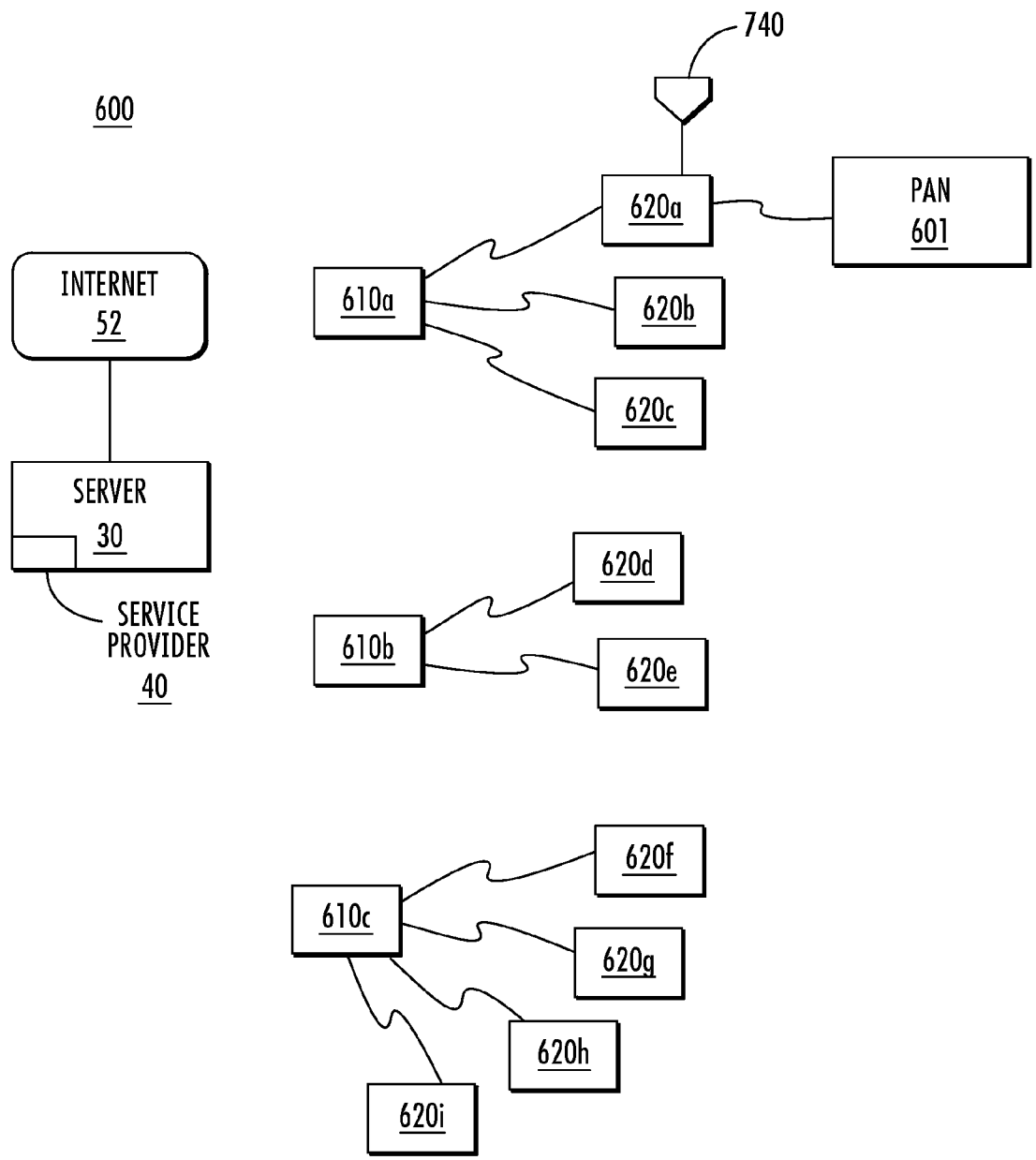

FIG. 6 provides a general overview of a wireless communication system in accordance with one embodiment.

Figure 7:
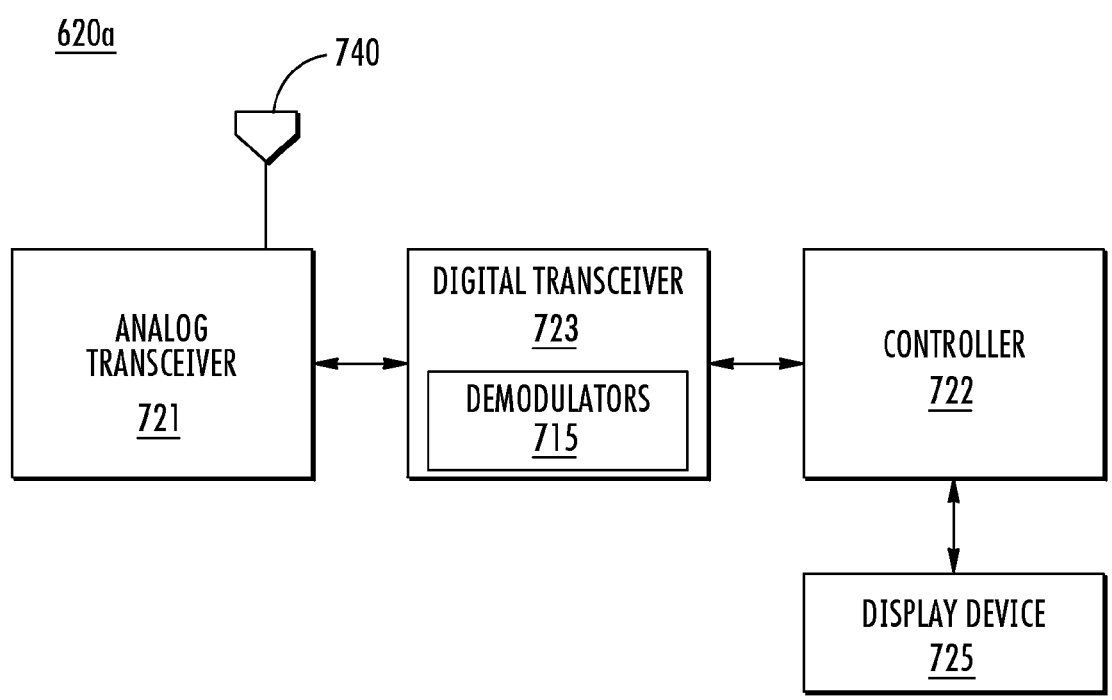

FIG. 7 illustrates the primary functional blocks in an exemplary transceiver in a wireless communication system in accordance with one embodiment.

Figure 8:
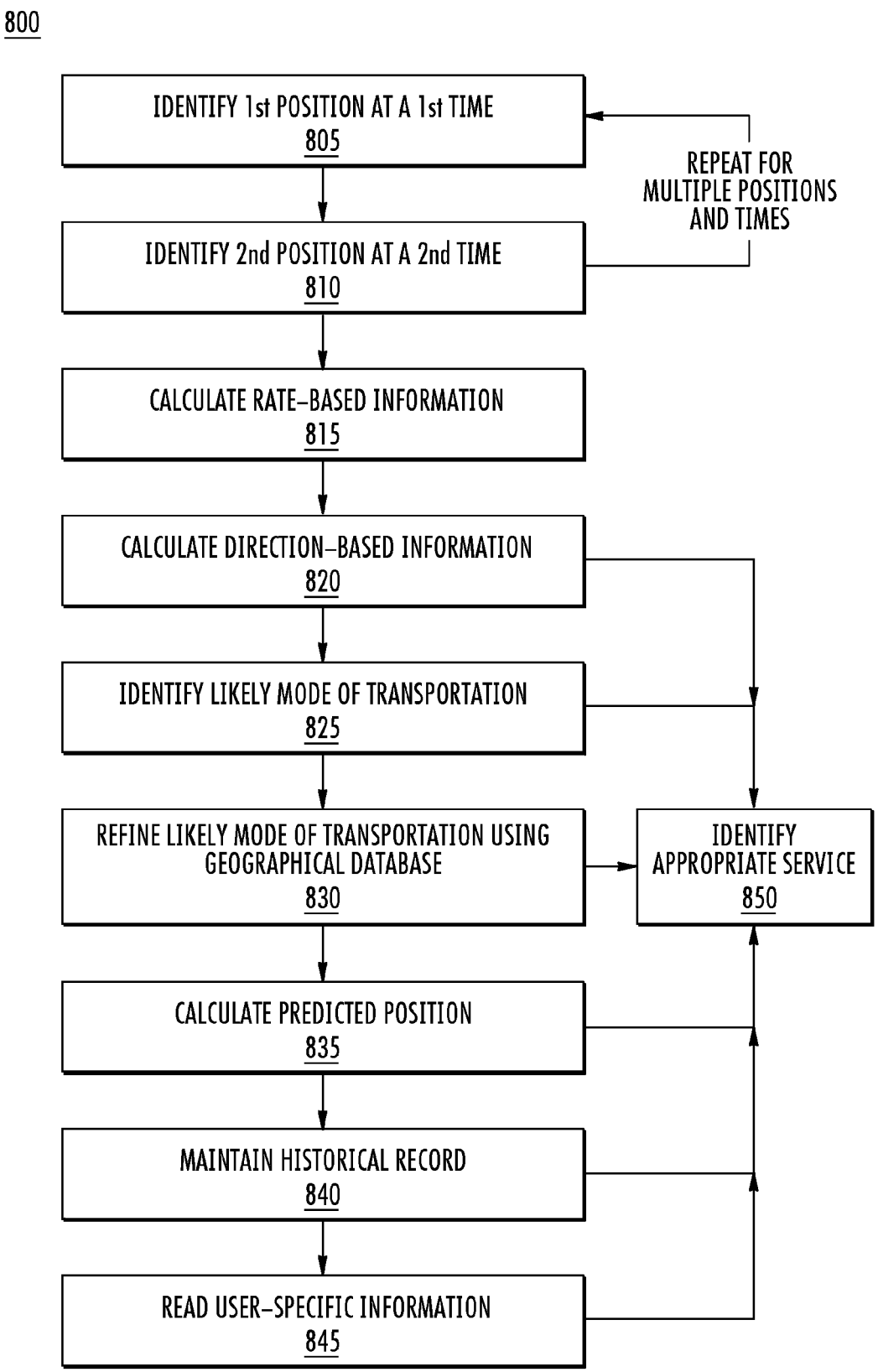

FIG. 8 is a flowchart of the steps in a process for targeting services according to location-based information derived from a wireless transceiver in accordance with one embodiment.

Figure 9:
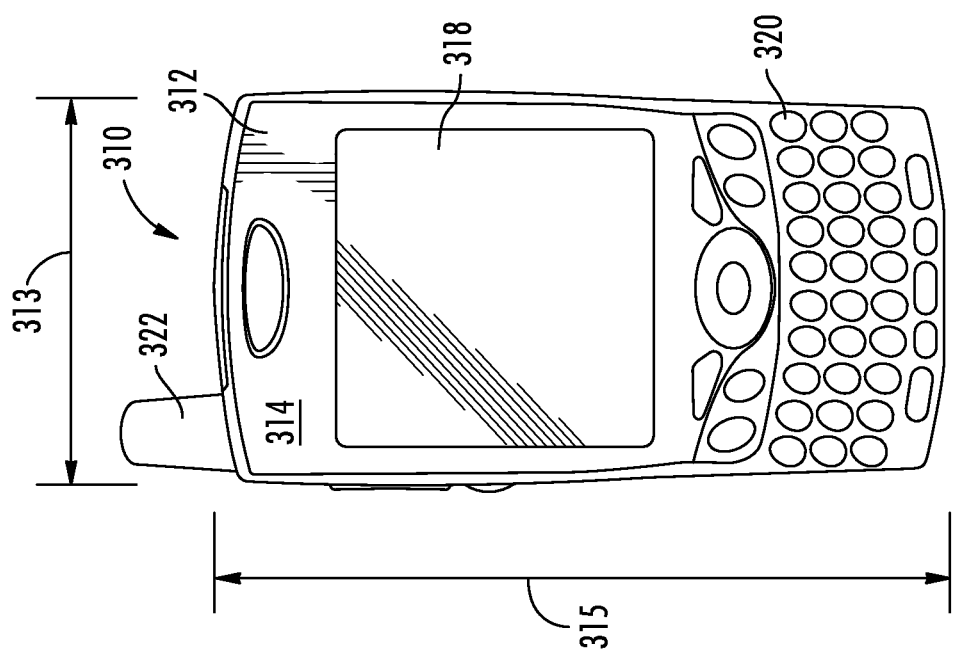

FIG. 9 is a front view of a mobile computing device according to an exemplary embodiment.

Figure 10:
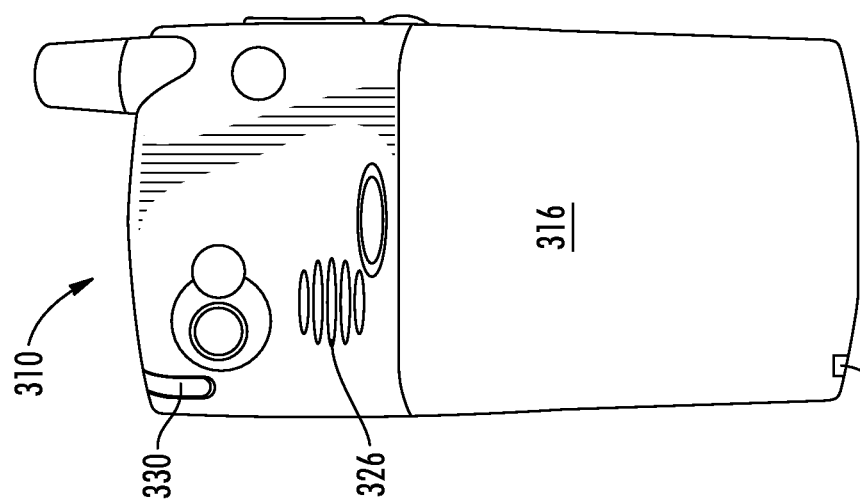

FIG. 10 is a back view of the mobile computing device of FIG. 9 according to an exemplary embodiment.

Figure 11:
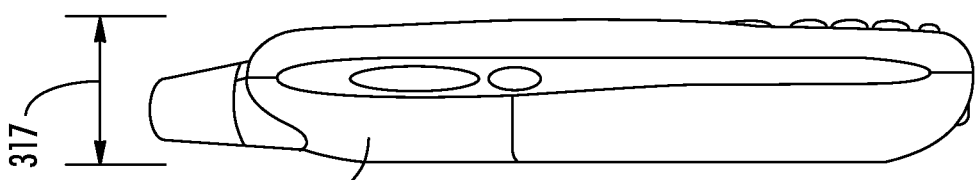

FIG. 11 is a side view of the mobile computing device of FIG. 9 according to an exemplary embodiment.

Figure 12:
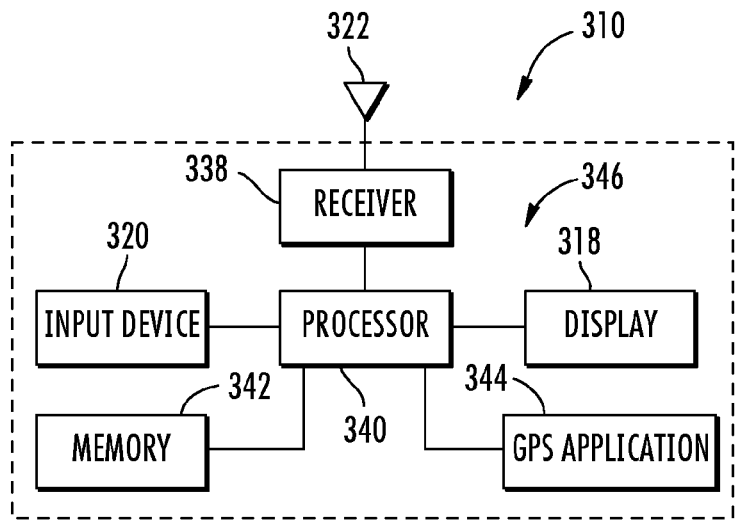

FIG. 12 is a block diagram of the mobile computing device of FIG. 9 according to an exemplary embodiment.

Figure 13:
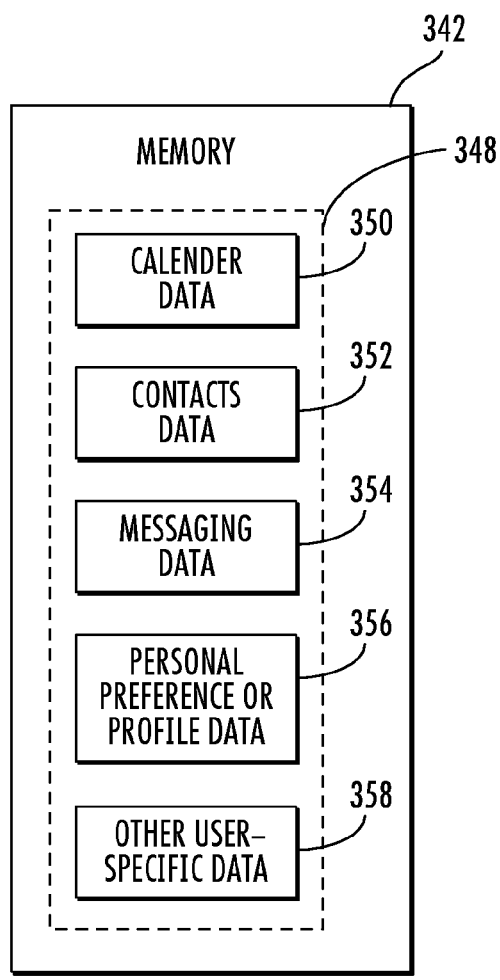

FIG. 13 is a block diagram showing a memory of the mobile computing device of FIG. 9 according to an exemplary embodiment.

FIG. 14 is a schematic representation of the mobile computing device of FIG. 9 in communication with a number of advertisement services according to an exemplary embodiment.

FIG. 15 is a flowchart illustrating a method of providing advertisement data according to an exemplary embodiment.

FIG. 16 is a flowchart illustrating a method of providing advertisement data according to another exemplary embodiment.

FIGS. 17-19 are schematic representations of a display of the mobile computing device of FIG. 9 according to various exemplary embodiments.

DETAILED DESCRIPTION

The present disclosure provides a method and system thereof that can be used to more effectively target advertisements and other services to users of wireless communication devices. The present disclosure pertains to a method and system thereof for targeting content and services (e.g., an advertisement) according to location-based information derived from a mobile wireless transceiver device. In one embodiment, position information as a function of time is used to calculate a rate of travel and a direction of travel. This information can also be used to identify a likely mode of transportation. In another embodiment, geographical information can be used to further refine the mode of transportation. The rate and direction of travel and/or the likely mode of transportation can be considered, along with other information described below, to identify content or services more precisely targeted to the user's circumstances.

Various embodiments can be implemented on the wireless transceiver device itself, on a portable computer system (e.g., a palmtop or personal digital assistant) coupled to the wireless transceiver device, or on a computer system (e.g., a server computer system) communicatively couple to the wireless transceiver device.

In one embodiment, position and time information indicating the positions of the wireless transceiver device as a function of time are used to calculate rate-based information, such as a rate of travel, and direction-based information, such as direction of travel. The rate-based information and the direction-based information can be used by a service provider to more precisely target content (e.g., a service or advertisement) according to the circumstances of the user.

In another embodiment, the rate of travel and the direction of travel are correlated to geographical information of transportation. For example, the geographical database to further refine the selection of the likely mode of transportation. For example, the geographical database can be used to determine whether the user is on a highway traveling by automobile or by train. Thus, additional precision can be provided for targeting the service or advertisement.

Furthermore, in another embodiment, the rate of travel and the direction of travel can be used to predict a future position for the user, so that a service or advertisement can be targeted accordingly.

In yet another embodiment, a historical record of the rate-position information and/or the mode of transportation can be generated and maintained for each user and/or device. The historical record can also be factored into the selection of content to be provided.

In still another embodiment, information stored on the wireless communication device is used to further refine the targeting of an advertisement or service. For example, in a portable computer system, users often store key dates such as birthdays and the like. This type of information can be used along with the rate-based and direction-based information to target an appropriate service or advertisement.

Thus, in addition to the position of the wireless transceiver devices, factors such as the rate of travel, the direction of travel, and the likely mode of transportation can also be considered in order to more precisely identify an appropriate service or advertisement. Moreover, a potential destination can be predicted, allowing further refinement of the targeted content.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "sending" or "receiving" or "providing" or "calculating" or "identifying" or "correlating" or "maintaining" or "sampling" or "reading" or "using" or the like, refer to the action and processes of a computer system (e.g., process 800 of FIG. 8), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
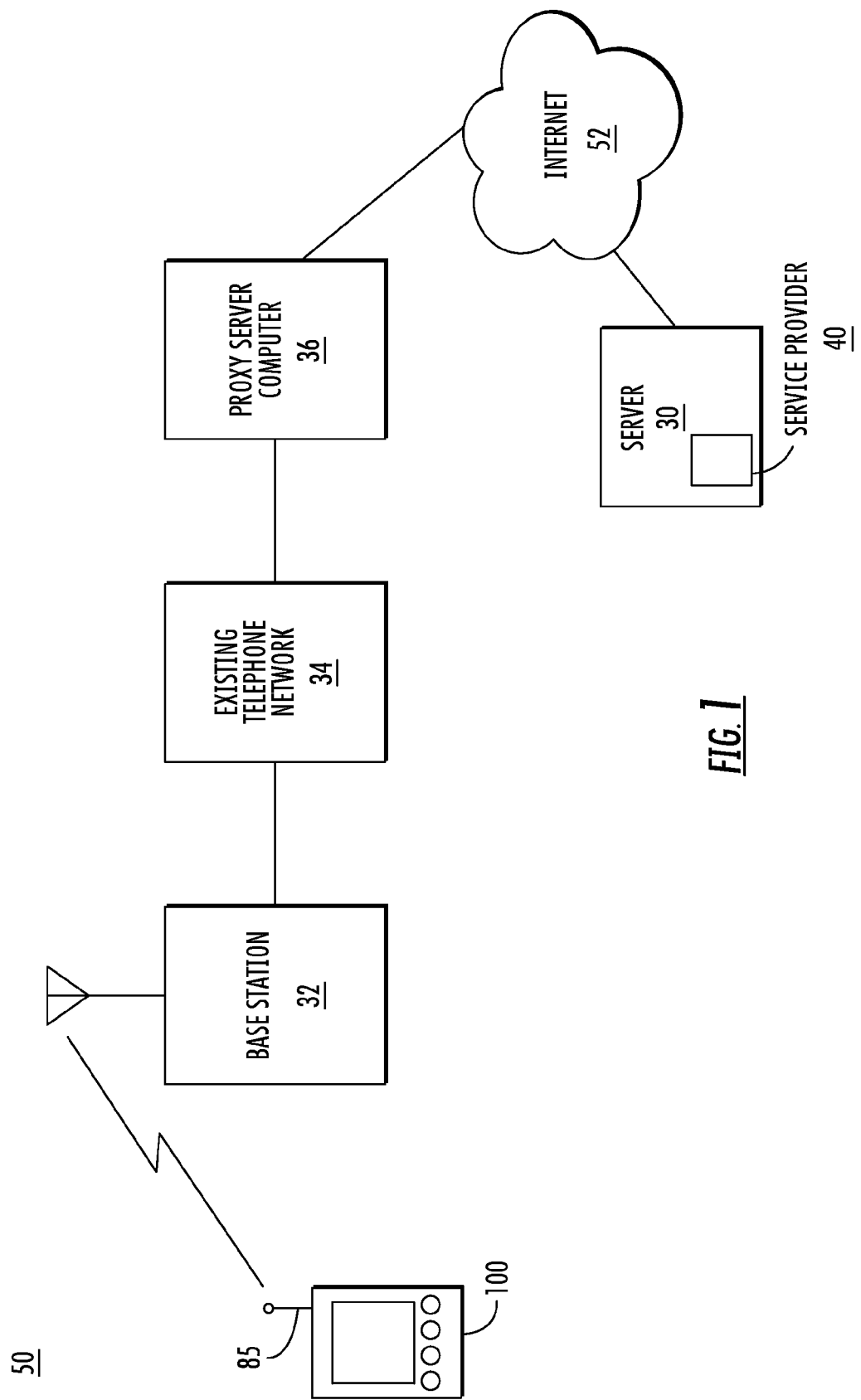
FIG. 1 is a block diagram of an exemplary communications network including a portable computer system with wireless communication capability in accordance with one embodiment.

FIG. 1 is a block diagram of an exemplary communications network 50 including a portable computer system with wireless communication capability in accordance with one embodiment. Portable computer system 100 is also known as a palmtop, hand-held or palm-sized computer system or personal digital assistant (PDA).

In the present embodiment, portable computer system 100 has the ability to transmit and receive data and information over a wireless communication interface (e.g., a radio interface). In one embodiment, the wireless communication interface is integrated into portable computer system 100; in another embodiment, the wireless communication interface is accomplished with a wireless modem attachment (not shown). Wireless signals are transmitted and received by portable computer system 100 using antenna 85.

In the present embodiment, base station 32 is both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52.

Coupled with Internet 52 are multiple servers exemplified by server 30. Residing on server 30 is an agent or application operated by service provider 40. Service provider 40, in one embodiment, provides services associated with identifying client patterns using location-based information and for targeting services to users based on their location, rate of travel, direction of travel, as well as other information. Additional information is provided in conjunction with FIG. 8, below.

It should be further appreciated that other embodiments of a communications network, planned or envisioned, may be utilized in accordance with the present invention. For example, a wireless connection may be made from portable computer system 100 via antenna 85 directly to the Internet 52.

The data and information which are communicated between base station 32 and portable computer system 100 via antenna 85 are the same type of information and data that can conventionally be transferred and received over a public telephone wire network system. However, a wireless communication interface is utilized to communicate data and information between portable computer system 100 and base station 32. It should be appreciated that one embodiment of a wireless communication system in accordance with the present invention is the Mobitex wireless communication system.

Figure 2:
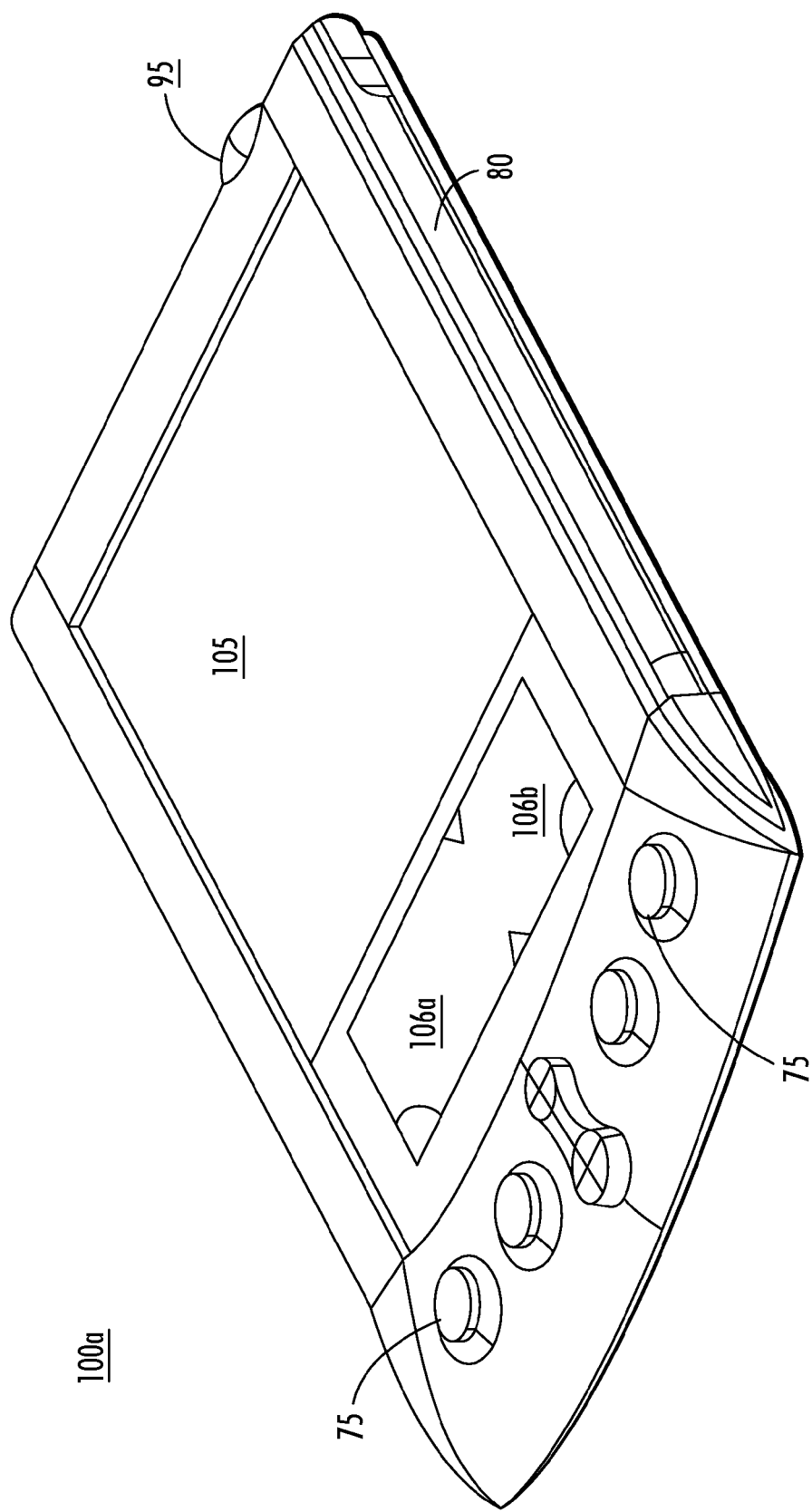
FIG. 2 is a top side perspective view of a portable computer system in accordance with one embodiment.

FIG. 2 is a perspective illustration of the top face 100a of one embodiment of the portable computer system 100. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2 also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 3:
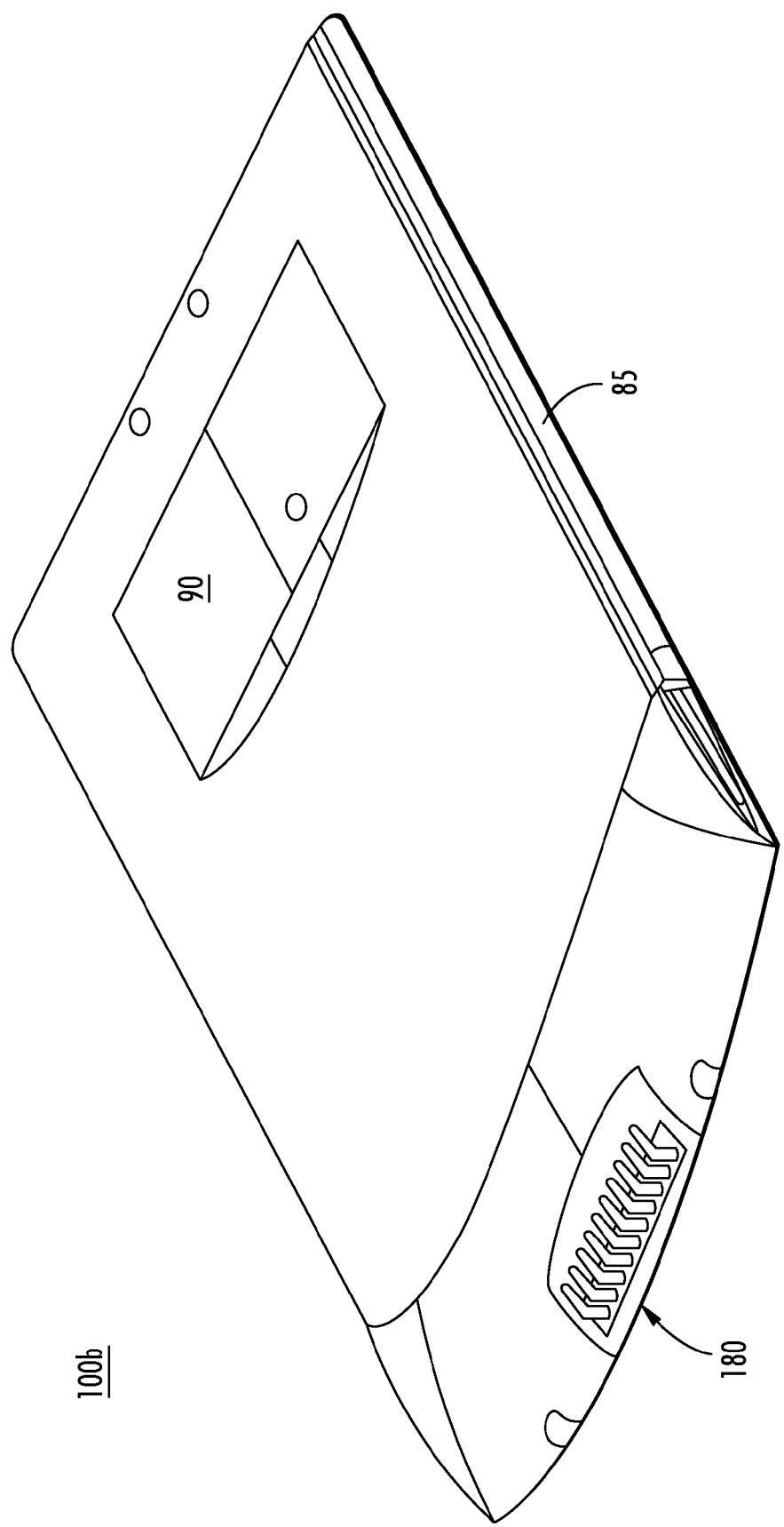
FIG. 3 is a bottom side perspective view of the portable computer system of FIG. 2.

FIG. 3 illustrates the bottom side 100b of one embodiment of the portable computer system 100 that can be used in accordance with various embodiments. A communication interface 180 is also shown. In one embodiment, the communication interface 180 is a serial communication port, but could also alternatively be of any of a number of well-known communication standards and protocols, e.g., parallel, SCSI (small computer system interface), Firewire (IEEE 1394), Ethernet, etc. An antenna 85 and a battery storage compartment door 90 are shown.

Figure 4:
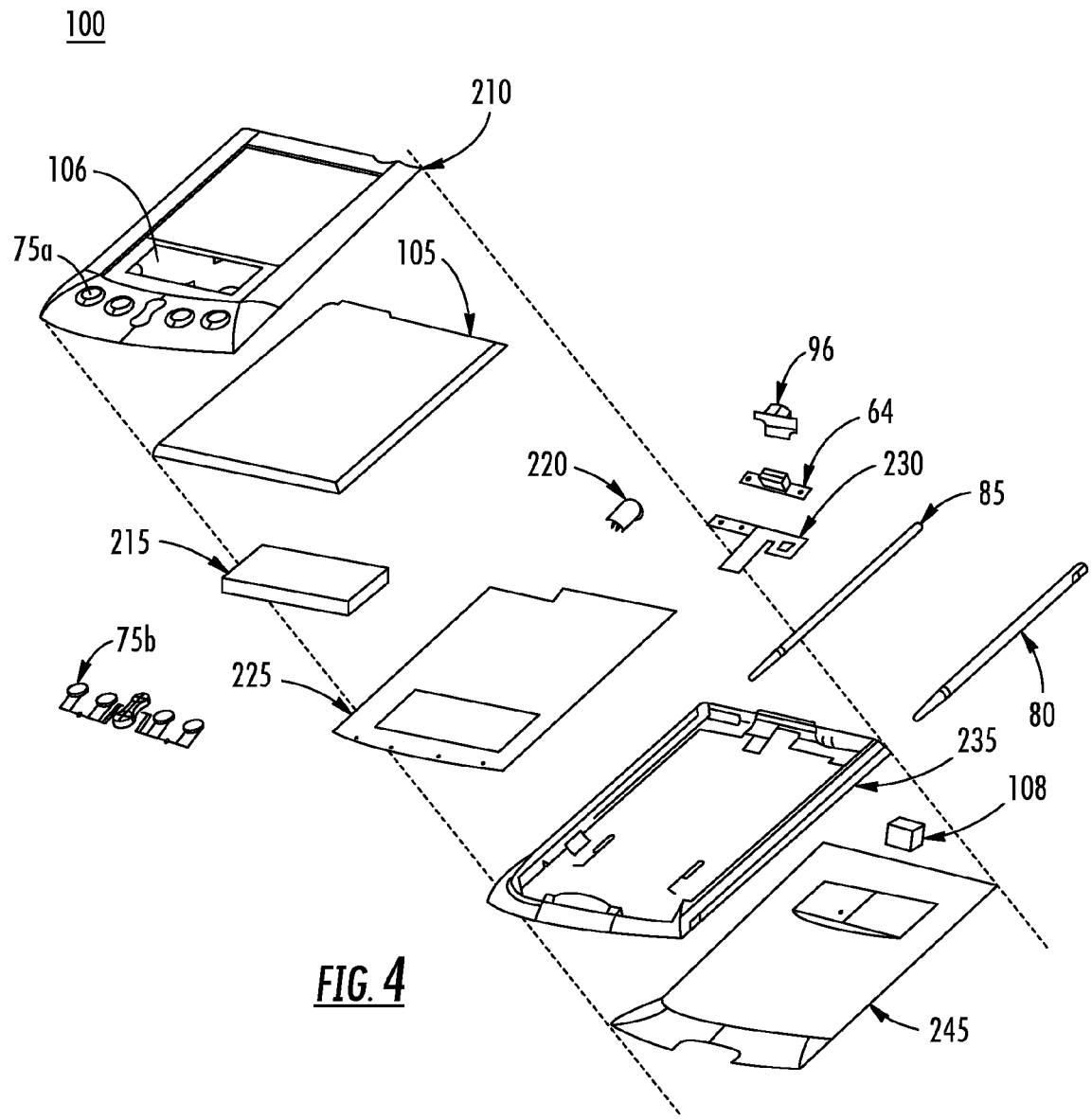
FIG. 4 is an exploded view of one embodiment of a portable computer system of FIG. 2.

FIG. 4 is an exploded view of the portable computer system 100 in accordance with one implementation. Portable computer system 100 contains a back cover 245 and a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown, as well as an on/off button 95. A flex circuit 230 is shown along with a printed circuit (PC) board 225 containing electronics and logic (e.g., memory, communication bus, processor, etc.) for implementing computer system functionality. The digitizer pad is also included in PC board 225. A midframe 235 is shown along with stylus 80. Position-adjustable antenna 85 is also shown.

Infrared communication mechanism 64 (e.g., an infrared emitter and detector device) is for sending and receiving information from other similarly equipped devices. A signal (e.g., radio) receiver/transmitter device 108 is also shown. The receiver/transmitter device 108 is coupled to the antenna 85 and also coupled to communicate with the PC board 225. In one implementation, the Mobitex wireless communication system is used to provide two-way communication between portable computer system 100 and other computers and/or the Internet via a proxy server (see FIG. 1).

Figure 5A:
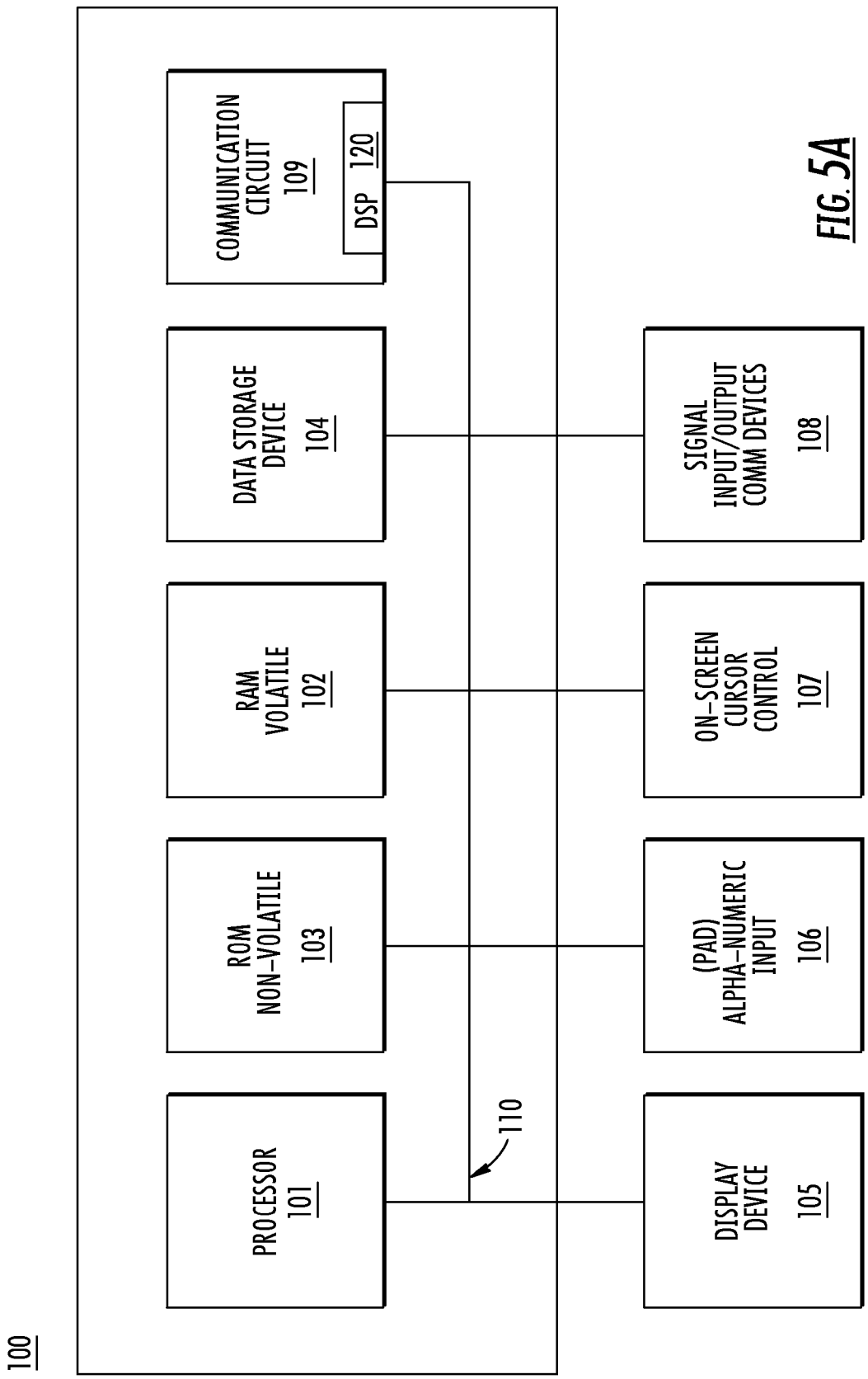
FIG. 5A is a block diagram of one embodiment of a portable computer system.

FIG. 5A is a block diagram of the circuitry of an exemplary portable computer system 100 upon which various embodiments may be practiced. In the present embodiment, portable computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Portable computer system 100 also includes an optional data storage device 104 (e.g., memory stick) coupled with the bus 110 for storing information and instructions. Data storage device 104 can be removable. As described above, portable computer system 100 also contains a display device 105 coupled to the bus 110 for displaying information to the computer user. In a portable computer system 100, PC board 225 can contain the processor 101, the bus 110, the ROM 103 and the RAM 102.

With reference still to FIG. 5A, in the present embodiment, portable computer system 100 also includes a signal transmitter/receiver device 108, which is coupled to bus 110 for providing a physical communication ink between portable computer system 100 and a communication network (e.g., wireless communication network 50 of FIG. 1). As such, signal transmitter/receiver device 108 enables portable computer system 100 to communicate wirelessly with other electronic systems coupled to the communication network.

It should be appreciated that within the present embodiment, signal 20 transmitter/receiver device 108 is coupled to antenna 85 (FIG. 4) and provides the functionality to transmit and receive information over a wireless communication interface. It should be further appreciated that the present embodiment of signal transmitter/receiver device 108 is well suited to be implemented in a wide variety of ways. For example, signal transmitter/receiver device 108 could be implemented as a modem.

In one embodiment, portable computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

In one embodiment, portable computer system 100 includes an optional alphanumeric input device 106 that in one implementation is a handwriting recognition pad ("digitizers") having regions 106a and 106b (FIG. 2), for instance. Alphanumeric input device 106 can communicate information and command selections to processor 101. Portable computer system 100 can also include an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. The display device 105 utilized with portable computer system 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

Refer now to FIG. 5B which illustrates an exemplary computer system 590 upon which various embodiments may be practiced. In the present embodiment, computer system 590 exemplifies server 30 of FIG. 1. In general, computer system 590 comprises bus 500 for communicating information, processor 501 coupled with bus 500 for processing information and instructions, random access (volatile) memory (RAM) 502 coupled with bus 500 for storing information and instructions for processor 501, read-only (non-volatile) memory (ROM) 503 coupled with bus 500 for storing static information and instructions for processor 501, data storage device 504 such as a magnetic or optical disk and disk drive coupled with bus 500 for storing information and instructions, an optional user output device such as display device 505 coupled to bus 500 for displaying information to the computer user, an optional user input device such as alphanumeric input device 506 including alphanumeric and function keys coupled to bus 500 for communicating information and command selections to processor 501, and an optional user input device such as cursor control device 507 coupled to bus 500 for communicating user input information and command selections to processor 501. Furthermore, an input/output (I/O) device 508 is used to couple computer system 590 onto, for example, a network (e.g., Internet 52).

FIG. 6 provides a general overview of a wireless communication system 600 in accordance with one embodiment. Communication system 600 consists of a family of base stations 610a, 610b and 610c (e.g., cells) that are geographically distributed over the service area. Communication system 600 also includes a plurality of subscriber stations (e.g., transceivers 620a-620i). Communication system can be coupled to a standard telephone wire system (not shown).

Each of transceivers 620a-620i is exemplified as a mobile station such as a personal cordless telephone, a pager, or a computer system with a wireless modem; however, a subscriber station may also be in a relatively fixed location, such as a conventional computer system with a wireless modem or the like.

Wireless communication is established between a base station (e.g., base station 610a) and a subscriber station (e.g., transceiver 620a) using well-known techniques. Communication can occur using multipath signals from base station 610a to transceiver 620a. Wireless signals are transmitted and received by transceiver 620a using antenna 740.

In one embodiment, transceiver 620a is communicatively coupled to other devices in a personal area network (PAN) 601 using wireless connections such as Bluetooth. Each of the devices in PAN 601 can be in communication with each other. Typically, PAN 601 comprises mobile devices with which a user can travel with relative ease, such as PDAs (e.g., portable computer system 100 of FIG. 5), cell phones, and pagers. However, the devices in PAN 601 can include printers, desktop computer systems, fax machines, and laptop computer systems as well as PDAs, cell phones, and pagers.

A message received by one device in PAN 601 can be communicated to the other devices in the personal area networks. Similarly, when the location of one of the devices in PAN 601 is known, the locations of the other devices in the personal area network is also known with reasonable certainty.

In one embodiment, base station 610a enables a wireless connection from transceiver 620a to Internet 52, and then to server 30 and service provider 40 (see also FIG. 1). It is appreciated that, alternatively, transceiver 620a may communicate directly with Internet 52, specifically server 30 and service provider 40, via a wireless connection. As mentioned above, residing on server 30 is an agent or application operated by service provider 40. Service provider 40, in one embodiment, provides services associated with identifying client patterns using location-based information and for targeting services to users based on their location, rate of travel, direction of travel, as well as other information. Additional information is provided in conjunction with FIG. 8, below.

FIG. 7 illustrates the primary functional blocks in a subscriber station exemplified by transceiver 620a in accordance with one embodiment. Analog transceiver 721 is used, for example, to receive the communication signal from base station 610a (FIG. 6) and convert it from an analog signal to a digital baseband signal. Controller 722 executes the control logic for transceiver 620a and consists of, for example, a central processing unit, a digital signal processor (if present), hardware control and associated software. Digital transceiver 723 contains the digital data processing elements such as demodulators 715. Antenna 740 is also shown.

Also shown is a display device 725. The display device 725 utilized with transceiver 620a may be a liquid crystal display device, a cathode ray tube (CRT), a field emission display device (also called a flat panel CRT) or other display device suitable for generating graphic images and alphanumeric characters recognizable to the user.

FIG. 8 is a flowchart of the steps in a process 800 for targeting services according to location-based information derived from a wireless transceiver device in accordance with one embodiment. In one embodiment, process 800 can be implemented via computer-readable program instructions stored in a memory unit (e.g., random access memory 102, read-only memory 103, and/or data storage device 104) and executed by processor 101 of portable computer system 100 (FIG. 5A). In another embodiment, process 800 can be implemented via computer-readable program instructions stored in a memory unit (e.g., random access memory 502, read-only memory 503, and/or data storage device 504) and executed by processor 501 of computer system 590 (FIG. 5B). In the latter embodiment, computer system 590 may be a server 30 (FIGS. 1 and 6) communicatively coupled to the wireless transceiver device.

In one embodiment, the wireless transceiver device may be incorporated into portable computer system 100 as shown by FIG. 5A. In another embodiment, the wireless transceiver device may be a cordless telephone, pager or the like as exemplified by transceiver 620a of FIG. 6. It is appreciated that other types of wireless transceiver devices may be used in accordance with the present invention. Furthermore, it is appreciated that the wireless transceiver device may be separate from but communicatively coupled to portable computer system 100 or transceiver 620a, such as in PAN 601 of FIG. 6.

In step 805 of FIG. 8, in the present embodiment, the position (location) of the wireless communication device (and hence the user) is identified at a first time. Mechanisms for identifying the location of the Wireless communication device are known in the art. For example, cellular network providers generally track the locations of cell phones in order to complete incoming calls. In addition, many cell phones have, or will have, the capability to identify their position to dispatchers for emergency situations in which a "911" call is made. Cell phone capabilities are being added to a number of other types of devices including PDAs, thereby allowing the position of these devices to also be determined. Other types of wireless communication devices may be equipped with Global Positioning System (GPS) capability allowing their locations to be pinpointed. In any case, users of wireless communication devices can often be located to an acceptable degree of accuracy.

In one embodiment, the information indicating position and time is sent to computer system 590 of FIG. 5B (e.g., server 30 of FIGS. 1 and 6) from the wireless communication device. In another embodiment, the information indicating position and time is sent to portable computer system 100 from the wireless communication device. The position information may be sent from the wireless communication device to these devices on a relatively continuous basis, or the information may be stored by the wireless communication device and sampled by these devices at a scheduled time, or at specified time intervals.

In step 810 of FIG. 8, in the present embodiment, a second position of the wireless communication device is measured at a second time, in a manner similar to that described above for step 805. It is appreciated that steps 805 and 810 can be repeated on a continuous basis or at periodic intervals so that multiple positions at multiple times can be determined. As described above, the position and time information can be stored and then sent to portable computer system 100 or server 30 (e.g., computer system 590) at a later time, sampled at periodic intervals, or the information can be sent these devices on a relatively continuous basis.

In step 815, in the present embodiment, the position and time information from steps 805 and 810 is used to calculate rate-based information such as the user's rate of travel. The rate of travel can be calculated by dividing the distance traveled (the difference between two positions) by the amount of time taken to travel that distance (the difference between the times associated with those positions). Different sets of position and time information can be used to determine the rate of travel at different points along the users path. An average rate of travel along different segments of the path, or for the overall journey, can be determined using either all of the position information or a sample thereof. The position and time information can also be evaluated using "best-fit" calculations.

In step 820 of the present embodiment, direction-based information, such as the direction of travel, is calculated using the position information from steps 805 and 810. In one embodiment, a best-fit algorithm is applied to all of the position information, or a sample thereof, to determine the direction of travel. In one embodiment, the time information is also used to determine direction as a function of time. As above, different sets of position and time information can be used to determine the direction of travel at different points along the user's path.

Together, the rate-based information from step 815 and the direction-based information from step 820 provide a "rate-position vector" indicating the user's rate and direction of travel along segments of the user's path, or for the overall journey. In one embodiment, the rate-based information and the direction-based information are used to provide content based on the rate and direction of travel (step 850, further described below).

In step 825, in one embodiment, the rate-based information (e.g., the rate of travel) is used to heuristically determine the likely mode of transportation; that is, whether the user is walking or traveling in some type of vehicle. A lookup table can be used to correlate rates of travel to likely modes of transportation. Thus, the present embodiment provides a means for intelligently selecting a mode of transportation which the user is likely to be using. In one embodiment, the rate-based information, the direction-based information and/or the likely mode of transportation are used to provide content based on the rate and direction of travel (step 850).

In step 830, in one embodiment, the rate-position vector (from step 820) can be correlated to geographical information in a database to narrow the mode of transportation to an even more likely choice. Databases containing geographical information, and the application of such databases to locating a user (e.g., on a map), are known in the art. In the present embodiment, by comparing the user's position, rate of travel and direction of travel to known infrastructures (e.g., highways, rail lines, etc.) in the geographical database, the user can be placed on a highway, on a railroad, or the like.

Accordingly, a more precise deduction can be made of the mode of transportation being used. In particular, what type of vehicle the user is riding in, such as an automobile or in a train, can be identified. In one embodiment, the rate-based information, the direction-based information and/or the refined choice for the likely mode of transportation are used as the basis for providing content (step 850).

In step 835, in the present embodiment, the rate of travel and direction of travel are used to estimate a prospective position of the user. In one embodiment, the likely mode of transportation is also factored in order to better predict the user's prospective position. In another embodiment, the user's prospective position at various times in the future is estimated. In one embodiment, the rate-based information, the direction-based information, the likely mode of transportation, and/or the estimated future position of the user are used as the basis for providing content (step 850).

In step 840 of FIG. 8, in one embodiment, an historical record for the wireless communication device (and its user) can be stored and updated. That is, the rate-position vector and mode of transportation can be determined over a period of time and stored in a memory unit of either portable computer system 100 (FIG. 5A) or computer system 590 (FIG. 5B). The historical record can be uniquely associated with the user and/or with the wireless transceiver device. The historical record can then also be factored into the selection of content to be provided (step 850).

In step 845 of FIG. 8, in one embodiment, user-specific information is read from the wireless communication device and factored into the selection of an appropriate service (step 850). For example, many users record key dates in the memory unit of their portable computer systems. Information such as a birth date can be retrieved from memory and used to further specify an appropriate service in combination with the user's rate and direction of travel and/or likely mode of transportation.

Also, information stored in the address book of a portable computer system can be used to identify not only that an associate is nearby, but that it is possible to meet. The user's mode of transportation, direction of travel, rate of travel, and predicted position, as well as similar information for the user's associate, can be correlated to determine whether a meeting is possible. That is, it is possible to determine the difference between whether the user and the associate are both walking to a common point, or whether they are passing in opposite directions on different sides of a highway.

In step 850, in the present embodiment, the content provided includes services that are appropriate to the users current circumstances, or the user's predicted circumstances. These services can be identified and communicated to the user via the wireless communication device (e.g., portable computer system 100 of FIG. 1, transceiver 620a of FIG. 6, or a device in PAN 601 of FIG. 6), and displayed to the user on that device. Conversely, services not appropriate to the user's circumstances can be identified and not sent to the user.

The content can include, but are not limited to, advertisements for merchants. It is appreciated that other information, in addition to the location-based information described above, can be factored into the selection of the appropriate content or service. For example, weather conditions, time of day, and the like can be considered to further refine the selection of the appropriate content or service.

In one embodiment, a user profile can be set up, either on portable computer system 100, transceiver 620a, or server 30 (FIGS. 1 and 6), to indicate user preferences for certain services, types of services, and the like. The information in the user profile can also be considered when selecting the appropriate service.

Thus, a device and method are provided that can be used to more effectively target advertisements and other services to users of wireless communication devices. By considering other factors beyond simply the user's location, such as the user's rate of travel, direction of travel, and mode of transportation, a much more fine-grained targeting of services and advertisements is possible.

An exemplary embodiment identifying client patterns using online location-based derivative analysis, is thus described. While the present disclosure has been described with respect to particular embodiments, it should be appreciated that the present disclosure should not be construed as limited by such embodiments, but rather construed according to the below claims.

Referring now to FIGS. 9-19 disclosed is a system and method for providing location-based advertisements using a mobile computing device. In some embodiments, the advertisement data is based upon both the location of the mobile computing device and user-specific data stored on or retrievable by the mobile computing device.

Referring to FIGS. 9-11, a mobile computing device 310 is shown. The teachings herein can be applied to device 310 or to other electronic devices (e.g., a desktop computer), mobile computing devices (e.g., a laptop computer) or handheld computing devices, such as a personal digital assistant (PDA), smartphone, mobile telephone, personal navigation device, etc. According to one embodiment, device 310 is a smartphone, which is a combination mobile telephone and handheld computer having PDA functionality. PDA functionality can comprise one or more of personal information management (e.g., including personal data applications such as email, calendar, phone, text messaging, etc.), database functions, word processing, spreadsheets, voice memo recording, Global Positioning System (GPS) functionality, etc. Device 310 is configured to synchronize personal information from these applications with a computer (e.g., a desktop, laptop, server, etc.). Device 310 is further configured to receive and operate additional applications provided to device 310 after manufacture, e.g., via wired or wireless download, SecureDigital card, etc.

As shown in FIGS. 9-11, device 310 includes a housing 312 and a front side 314 and a back side 316. Device 310 further comprises a display 318 and a user input device 20 (e.g., a QWERTY keyboard, buttons, touch screen, speech recognition engine, etc.). Display 318 can comprise a touch screen display in order to provide user input to a processor 340 (see FIG. 12) to control functions, such as to select options displayed on display 318, enter text input to device 310, or enter other types of input. Display 318 also provides images (see, e.g., FIG. 14) that are displayed and may be viewed by users of device 310. User input device 320 can provide similar inputs as those of touch screen display 318. Device 310 can further comprise a speaker 326, and a stylus 330 to assist the user in making selections on display 318.

According to an exemplary embodiment, housing 312 is configured to hold a screen such as display 318 in a fixed relationship above a user input device such as user input device 320 in a substantially parallel or same plane. This fixed relationship excludes a hinged or movable relationship between the screen and the user input device (e.g., a plurality of keys) in the fixed embodiment. Device 310 may be a handheld computer, which is a computer small enough to be carried in a hand of a user, comprising such devices as typical mobile telephones and personal digital assistants, but excluding typical laptop computers and tablet PCs.

In various embodiments, housing 312 could be any size, shape, and dimension. In some embodiments, housing 312 has a width 313 of no more than about 200 mm or, alternatively, no more than about 100 mm. According to some of these embodiments, housing 312 has a width 313 of no more than about 85 mm or, alternatively, no more than about 65 mm. According to some embodiments, housing 312 has a width 313 of at least about 30 mm or, alternatively, at least about 50 mm. According to some of these embodiments, housing 312 has a width 313 of at least about 55 mm.

In some embodiments, housing 312 has a length 15 of no more than about 200 mm or, alternatively, no more than about 150 mm. According to some of these embodiments, housing 312 has a length 15 of no more than about 135 mm or, alternatively, no more than about 125 mm. According to some embodiments, housing 312 has a length 315 of at least about 70 mm or, alternatively, at least about 100 mm. According to some of these embodiments, housing 312 has a length 315 of at least about 100 mm.

In some embodiments, housing 312 has a thickness 317 of no more than about 150 mm or, alternatively, no more than about 50 mm. According to some of these embodiments, housing 312 has a thickness 317 of no more than about 30 mm or, alternatively, no more than about 25 mm. According to some embodiments, housing 312 has a thickness 317 of at least about 10 mm or, alternatively, at least about 15 mm. According to some of these embodiments, housing 312 has a thickness 317 of at least about 50 mm.

In some embodiments, housing 312 has a volume of up to about 2500 cubic centimeters or, alternatively, up to about 1500 cubic centimeters. In some alternative embodiments, housing 312 has a volume of up to about 1000 cubic centimeters or, alternatively, up to about 600 cubic centimeters.

Referring now to FIG. 12, device 310 comprises a processing circuit 346 comprising a processor 340. Processor 340 can comprise one or more microprocessors, microcontrollers, and other analog and/or digital circuit components configured to perform the functions described herein. Processor 40 may comprise one or more memories (e.g., random access memory, read only memory, flash, etc.) configured to store software applications provided during manufacture or subsequent to manufacture by the user or by a distributor of device 310. In one embodiment, processor 340 can comprise a first applications microprocessor configured to run a variety of personal information management applications, such as email, a calendar, contacts, etc., and a second, radio processor on a separate chip or as part of a dual-core chip with the application processor. The radio processor is configured to operate telephony functionality. Device 310 can be configured for cellular radio telephone communication, such as Code Division Multiple Access (CDMA), Global System for Mobile Communications (GSM), Third Generation (3G) systems such as Wide-Band CDMA (WCDMA), or other cellular radio telephone technologies. Device 10 can further be configured for data communication functionality, for example, via GSM with General Packet Radio Service (GPRS) systems (GSM/GPRS), CDMA/1XRTT systems, Enhanced Data Rates for Global Evolution (EDGE) systems, Evolution Data Only or Evolution Data Optimized (EV-DO), and/or other data communication technologies.

Device 310 comprises a receiver 338 which comprises analog and/or digital electrical components configured to receive and transmit wireless signals via antenna 322 to provide cellular telephone and/or data communications with a fixed wireless access point, such as a cellular telephone tower, in conjunction with a network carrier, such as, Verizon Wireless, Sprint, etc. Device 310 can further comprise circuitry to provide communication over a local area network, such as Ethernet or according to an IEEE 802.11x standard or a personal area network, such as a Bluetooth or infrared communication technology.

Device 310 further comprises a microphone 336 (see FIG. 10) configured to receive audio signals, such as voice signals, from a user or other person in the vicinity of device 310, typically by way of spoken words. Alternatively or in addition, processor 340 can further be configured to provide video conferencing capabilities by displaying on display 318 video from a remote participant to a video conference, by providing a video camera on device 310 for providing images to the remote participant, by providing text messaging, two-way audio streaming in full- and/or half-duplex mode, etc.

Device 310 further comprises a location determining application, shown in FIG. 11 as GPS application 344. GPS application 344 can communicate with and provide the location of device 310 at any given time. Device 310 may employ one or more location determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), and so forth.

Device 310 may be arranged to operate in one or more location determination modes including, for example, a standalone mode, a mobile station (MS) assisted mode, and/or an MS-based mode. In a standalone mode, such as a standalone GPS mode, device 310 may be arranged to autonomously determine its location without real-time network interaction or support. When operating in an MS-assisted mode or an MS-based mode, however, device 310 may be arranged to communicate over a radio access network (e.g., UMTS radio access network) with a location determination entity such as a location proxy server (LPS) and/or a mobile positioning center (MPC).

Device 310 further comprises a memory 342 coupled to or as part of processor 340. Memory 342 may store a variety of information, data, applications, files, etc. that may be used or accessed using device 310. According to an exemplary embodiment as shown in FIG. 13, memory 342 may store user-specific data 348 (e.g., user profile data, user preference data, user-related data, personal information management data, etc.). User-specific data may include a number of different types of data related to a user of device 310. For example, as shown in FIG. 13, user-specific data 348 may include calendar data 350, contacts data 352, messaging data 354, personal preferences or profile data 56, and other user-specific data 358.

According to an exemplary embodiment, calendar data 350 may include various data related to an electronic calendar application capable of being run on device 310. For example, calendar data 350 may include data regarding various appointments such as location data (e.g., an individual's residence, a commercial establishment, an address or other geographic indicator such as a city, state, etc., a conference room number, and so on), time/date data (e.g., a date and/or time for a specific appointment, data regarding a recurring appointment, etc.), attendee data, and other data related to an appoint or meeting. According to an exemplary embodiment, calendar data 350 may include, for example, a name of an individual or commercial establishment that may be used to determine an associated geographic location (e.g., by looking up the name in a contacts application). According to various other exemplary embodiments, calendar data 350 may include a variety of other types of data, information, and so on.

According to an exemplary embodiment, contacts data 352 may include information regarding specific contacts, such as names, addresses, phone numbers, email addresses, fax numbers, and contact-specific notes (e.g., notes about the specific contact such as a birthday, anniversary, etc.). Processor 340 may utilize contacts data 352 to look-up various types of data (e.g., to determine an address when only a name is known, etc.). According to various other exemplary embodiments, contacts data 352 may include a variety of other types of data, information, and so on.

According to an exemplary embodiment, messaging data 354 may include information related to a variety of messaging applications including email, text messaging, short message service (SMS), and so on. For example, messaging data may include the content of an email, a text message, etc., email addresses, text messaging addresses, etc., and so on. According to various other exemplary embodiments, messaging data 354 may include a variety of other types of data, information, and so on.

According to an exemplary embodiment, personal preference or personal profile data 356 may include data that is specific to a user. Personal preference data 356 may be data that a user may customize by providing input to device 310. For example, device 310 may permit a user to set up a profile (e.g., by filling out an electronic form, answering a set of predetermined questions, providing key words, etc.) for himself or herself that identifies certain likes, dislikes, etc., such as favorite foods, favorite destinations, favorite sports, and so on (including least favorite preferences). As discussed in more detail below, this data may be accessed by processor 340 to filter advertisement data that is being directed to a user from various advertisement services, such that the relevancy of the advertisement data provided to the user, and therefore the usefulness of the advertisement data to the user, is improved. According to various alternative exemplary embodiments, personal preference data 356 may include a variety of other types of data, information, and so on, in addition to that disclosed herein. Furthermore, processor 340 may permit a user to update, customize, reconfigure, etc. personal preference data 356.

According to an exemplary embodiment, personal preference data 356 may further include parameters that define the number, type, frequency, etc. of the advertisement data that is delivered to device 310. For example, a user may indicate that they do not wish to receive any advertisement data (e.g., for a certain period of time), or the user may wish to limit the amount of advertisement data received (e.g., 2 ads per hour, 5 ads per day, etc.) or the type of advertisement data received (e.g., a user may indicate that they do not wish to receive pop-up ads or other type of ads). In a further exemplary embodiment, processor 340 may store any undelivered advertisement data that may later be accessed by a user (e.g., processor 340 may store all pop-up ads in a designated file or application that a user may access at their convenience). Other personal preference data 356 may be provided according to various other exemplary embodiments in order to further define and/or restrict the delivery of advertisement data to device 310.

According to various other exemplary embodiments, device 310 may utilize other data 358 as user-specific data 348 in accordance with the various embodiments disclosed herein. It should be understood that the various types of user-specific data 348 described herein are provided for purposes of illustration, and not limitation, and user-specific data 348 may include other data 358 not specifically addressed herein depending on the specific embodiment (e.g., data related to web-sites the user has visited using device 310, bookmarks or favorites for web-sites, data downloaded from a user's social networking account on a web-site (e.g., a MySpace or Facebook account), data related to audio and/or video clips (e.g., songs, videos, etc.), to-do lists, memo applications, gaming applications, etc.). The present disclosure is intended to be applicable to all such embodiments.

Referring to FIG. 14, device 310 is shown in communication with a number of advertisement services 360, 362, 364 according to an exemplary embodiment. Services 360, 362, 364 are located remotely from device 310 and are capable of wired and/or wireless communications with device 310. According to an exemplary embodiment, services 360, 362, 364 are configured to provide advertisement data to various types of computing devices, including device 310. Device 310 may communicate with services 360, 362, 364 while the location of device 310 changes (e.g., while a user of device 310 is walking, driving, traveling, etc.) such that the advertisement data may be provided based on the current location of device 310.

According to various exemplary embodiments, the advertisement data may include a variety of information and be provided in a variety of ways. For example, advertisement data may be provided to a user of device 310 in the form of a visual image provided on display 318. For example, an icon (see, e.g., FIG. 17) may be displayed on device 310 and may be selected by a user to provide an enlarged advertisement such as an electronic coupon, etc. (see, e.g., FIG. 18). Alternatively, rather than providing a visual display, device 310 may provide an audible message (e.g., a recording of an advertisement, etc.). Furthermore, the advertisement data may be provided on display 318 and superimposed over another image, such as the current image the user is viewing, a geographic map indicating the location of the establishment (s) the advertisement data is associated with (see FIG. 19), and so on. According to various other exemplary embodiments, other types of advertisement data may be provided to device 310 (e.g., text, graphics, audio data, video data, etc.). In some embodiments, advertisement data may be embedded in applications running on device 310, such as a contacts application, calendar application, and so on. For example, if a user has a contact entry for a contact or person, and the contact or person is, for example, a fan of a particular restaurant or sports team, device 310 may include 310 data regarding the particular restaurant or sports team (e.g., schedule, general information, score updates, coupons, advertisements, or other content, etc.), for example, within a contact field screen, or entry displayed by device 310. Device 310 may be configured to update the content displayed along with the contact screen periodically so that current advertisement data may be displayed. The advertisement data or other content displayed in the contact field or screen may be filtered based on user data, location conditions, or other criteria described herein.

Referring to FIG. 15, a flow chart illustrating an exemplary method of providing advertisement data to a device such as device 310 is shown. Device 310 first determines its location using GPS application 344 or another suitable location-determining application (step 370). Processor 340 then accesses user-specific data 348 (step 372). Accessing user-specific data 348 may include a variety of actions, including accessing any of calendar data 350, contacts data 352, messaging data 354, personal preference data 356, and/or other user-specific data 358. Processor 340 communicates with advertisement services 360, 362, 364 and, based upon the location of device 310 and user-specific data 348, processor 340 provides advertisement data from one or more of advertisement services 360, 362, 364 to the user.

For example, referring to FIGS. 15, 17, and 18, a user may be walking down a street having a variety of restaurants while carrying device 310. Device 310 is configured to determine its location using GPS application 344 and determine that advertisement services 360, 362, 364 have advertisements or advertisement data associated with the nearby restaurants. Processor 340 is configured to access user-specific data 348 and filter the advertisement data accordingly. For example, processor 340 may access messaging data 354 and parse the text of recent emails (or text messages, etc.) to determine whether there are key words, etc., that indicate a common theme, such as "sports," "pizza," etc., such that these key words may be used to select, for example, the restaurants that the user would most likely prefer (e.g., a sports bar, a pizza restaurant, etc.). Similarly, processor 340 may access personal preference data 356, which may include information related to a user's favorite restaurants, etc. Furthermore, processor 340 may access contacts data 352 to, for example, identify any commercial establishments that are in the user's contacts application, are nearby the user's current location, and are offering advertisement data. Further yet, processor 340 may retrieve phone numbers of recently placed and/or received calls and, in conjunction with contacts data 352, determine an address based on the phone number(s). Processor 340 may then determine whether the address(es) represent(s) any commercial establishments that offer advertisement data and are nearby the user. According to various exemplary embodiments, processor 340 may access one or more types of user-specific data 348 to provide a more or less rigorous filtering mechanism for providing advertisement data to device 310.

Referring to FIG. 17 the advertisement data may be provided as an icon 390 that is selectable by the user of device 310 such that upon selection by a user, a larger image is provided, such as image 396 shown in FIG. 18. As shown in FIGS. 17 and 18, "Add" and "Remove" buttons 392, 394 may be provided (e.g., as "soft buttons" on a display or touch screen) that permit a user to indicate whether to permit future advertisement data from the associated establishment, etc. to be provided on device 310 (e.g., by selecting "Remove," processor 340 may filter out advertisement data from advertisement services 360, 362, 364 such that the user does not receive advertisement data from the establishment associated with the current advertisement in the future). The use of buttons 392, 394 may further be used by processor 340 to, for example, modify personal preference data 356.

Referring to FIG. 16, a flow chart illustrating another exemplary method of providing advertisement data to a device such as device 310 is shown. As shown in FIG. 16, processor 340 accesses appointment data stored as a part of, for example, calendar data 350 (e.g., a date, time, and/or location for a future appointment of a user of device 310) (step 380). According to an exemplary embodiment, processor 340 accesses calendar data 350 without being prompted by a user by identifying the date and time of the appointment (e.g., by identifying any appointments in the next 2 hours, 1 day, next week, etc.) and accessing the data at a predetermined period of time prior to the appointment. According to another exemplary embodiment, a user may select a specific appointment the user wishes processor 340 to act upon (e.g., for planning purposes, etc.).

Processor 340 then identifies the location data (e.g., an address, a city, etc.) associated with the appointment (step 382). According to an exemplary embodiment, processor 340 may determine the location data for the appointment by parsing the text of a calendar entry (e.g., "Meeting at Joe's Restaurant") and referencing contacts data 352 to determine whether there is an address associated with "Joe's Restaurant" in contacts data 352. Alternatively, an address may be provided directly in the appointment data, which processor 340 may then use as the location data for the appointment. Further, a user may be prompted for or manually input the location data for an appointment if processor 340 cannot otherwise determine the location data for the appointment.

Processor 340 then determines the location of device 310 (step 384) using, for example, GPS application 344 or another suitable location-determining application. Alternatively, a user may be prompted for or otherwise manually input an alternative location (e.g., in the case of when the user knows he or she will be at another location in the near future, etc.).

Based upon the location data from the appointment and the location of device 310 (or other alternative location provided by the user), processor 340 may then provide advertisement data (step 386), for example, along the driving route between the location of the appointment and the current location of device 310 within a predetermined distance of the location of the appointment and/or the current location of device 310, and so on.

For example, referring to FIGS. 16 and 19, a user may have an appointment (e.g., a sporting event the user wishes to watch such as a baseball game) at a specific time/date at location 402. At a predetermined period of time prior to the appointment (e.g., 4 hours), processor 340 accesses the location data of the appointment (e.g., the location of a baseball stadium, etc.). Processor 340 also determines the current location 400 of device 310. Based upon the current location 400 of device 310 and location 402 of the appointment, processor 340 may then provide advertisement data to device 310 in advance of the appointment based on the current location 400, appointment location 402, time of day, or a combination of these or other factors. Furthermore, processor 340 may provide the advertisement data based upon, for example, a driving route 404 between locations 400, 402. As shown in FIG. 19, one or more icons 406, 408, 410 may be displayed that represent advertisements or advertisement data for various establishments (e.g., restaurants, parking ramps, etc.). Upon selecting one of icons 406, 408, 410, the user may be provided with a larger image (such as image 396 shown in FIG. 18) that includes additional advertisement data.

According to an alternative exemplary embodiment, processor 340 may further take into account user-specific data 348 in conjunction with locations 400, 402 in providing the advertisement data to device 310. For example, processor 340 may filter the types of restaurants on driving route 404 for which advertisement data is provided to device 310. This provides an additional filtering mechanism and increases the relevancy of the advertisement data delivered to the user of device 310. According to various other exemplary embodiments, a wide variety of other user-specific data 348 may be taken into account in providing advertisement data to device 310 in accordance with the embodiments shown in FIGS. 16 and 19.

According to various exemplary embodiments, a user may control (e.g., configure, control, define, input, etc.) the way in which data and information is used to provide or filter content or advertisement data to computing system 100 and/or device 310. The various embodiments herein illustrate numerous examples of the different types of data and information upon which the delivery of content or advertisement data may be based. According to some embodiments, a user may limit access to any or all of the data or other information upon which the delivery and/or filtering of the content or advertisement data is based.

For example, a user may configure system 100 and/or device 310 such that access is not provided to position or time information, direction of travel information, historical record data, user-specific information (e.g., key dates, address book information, etc.), weather conditions, time of day, or any information included in a user profile (e.g., user preferences, etc.), etc., as discussed with respect to FIGS. 1-8. The user may further limit access to various other types of data and information, such as calendar data, contacts data, messaging data, personal preference or profile data, or other user-specific or other data, as discussed with respect to FIGS. 9-19.

According to various exemplary embodiments, limiting access to the various types of data and information may be in the way of limiting the amount of data that may or may not be accessed, the type of data that may or may not be accessed, the time period(s) during which the data may or may not be accessed, or any other suitable method (e.g., limiting access to data for certain applications, limiting access to data based on a conditional basis such as the location of the user/mobile device, a rate of travel of the user/mobile device, another occurrence or input received or sensed by the mobile device, any user-defined condition, etc.).

For example, a user may wish to limit access to data that may be contained in a personal information management application such as an email application, calendar application, and/or a contacts application. The user may limit access to one or more of these applications either completely, or on a date/time/type basis (e.g., provide access to only emails dated after a certain date, limit access to only a certain "family" of contact entries, provide access to calendar data only for calendar entries scheduled for outside of normal working hours, and so on).

Permitting a user to control the access to data and information used to tailor and/or filter the delivery of advertisement data and content to devices such as device 310 and system 100 provides users with enhanced privacy which may not otherwise be available. It should be noted that while specific examples have been provided illustrating how a user may limit access to various data and information in providing content or advertisement data to users, it should be understood that users may configure device 310 and system 100 in a wide variety of configurations not specifically discussed herein. For example, access limits on data may be received and applied by processor 340 of device 310. Alternatively, access limits may be received and applied to advertisement data on a server remote from device 310 (e.g., a server associated with or separate from one or more of advertisement services 360, 362, 364). All such configurations and combinations of configurations are deemed to be within the scope of the present disclosure. Further, the selection of content, such as advertisements, or filtering of advertisements, for display on device 310 or sending to device 310 may occur on device 310 or on a server. Further, the selection or filtering of advertisements based on location or any other data may likewise occur on device 310 or on a server.

Many embodiments disclosed herein have been described with reference to block diagrams and flow diagrams. Each block may represent one or more computer programs (e.g., software, firmware, etc.) and/or the hardware or processing circuitry on which the computer programs operate (e.g., microprocessors, microcontrollers, applications-specific integrated circuits, programmable logic, programmable gate array, etc.). The recitation of a module, computer, server, or other unit in the specification (including claims) hereof is meant to include the use of multiple units or partial units configured to operate as the unit is described.

While the detailed drawings, specific examples and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the present disclosure as expressed in the appended claims.

What is claimed is:

1. A mobile device, comprising:
a processor; and
a memory coupled to the processor and configured to store user-specific data;
wherein the processor (i) accesses data indicating a current position of the mobile device and a prospective position of the mobile device, (ii) provides user-specific data to one or more servers by implementing an access limit so that at least some of the user-specific data is prevented from being provided to the one or more servers, and (iii) receives, from the one or more servers, advertisement data based on the current and prospective positions of the mobile device and the provided user-specific data;
wherein the prospective position of the mobile device is determined based on a rate of travel of the mobile device and a direction of the mobile device.

2. The mobile device of claim 1, wherein the user-specific data includes data associated with at least one of a date stored in the memory and data provided by an address book of the mobile device.

3. The mobile device of claim 1, wherein the processor provides a historical record of the mobile device to the one or more servers, the historical record including a record of at least one of a historical rate of travel of the mobile device and a historical position of the mobile device, wherein the advertisement data provided by the one or more servers is based on the historical record.

4. The mobile device of claim 1, further comprising:
a display device; and
wherein the processor displays a graphic feature corresponding to the advertisement data on the display device.

5. The mobile device of claim 1, wherein the advertisement data provided by the one or more servers is based on a mode of transportation of a user of the mobile device.

6. The mobile device of claim 5, wherein the mode of transportation is determined based on a rate of travel of the mobile device.

7. The mobile device of claim 5, wherein the mode of transportation is determined by correlating the position of the mobile device to a database of geographical information.

8. The mobile device of claim 1, wherein the access limit to the user-specific data is configurable by a user of the mobile device.

9. A method for operating a mobile computing device, the method being performed by a processor and comprising:
accessing data indicating a current position of the mobile computing device and a prospective position of the mobile computing device;
providing user-specific data, stored in a memory of the mobile computing device, to one or more servers by implementing an access limit so that at least some of the user-specific data is prevented from being provided to the one or more servers;
receiving, from the one or more servers, advertisement data based on the current and prospective positions of the mobile computing device and the provided user-specific data; and
wherein the prospective position of the mobile computing device is determined based on a rate of travel of the mobile computing device and a direction of the mobile computing device.

10. The method of claim 9, wherein the user-specific data includes data associated with at least one of a date stored in the memory and data provided by an address book of the mobile computing device.

11. The method of claim 9, further comprising providing a historical record of the mobile computing device to the one or more servers, the historical record including a record of at least one of a historical rate of travel of the mobile computing device and a historical position of the mobile computing device, wherein the advertisement data provided by the one or more servers is based on the historical record.

12. The method of claim 9, further comprising displaying a graphic feature corresponding to the advertisement data on a display device of the mobile computing device.

13. The method of claim 9, wherein the advertisement data provided by the one or more servers is based on a mode of transportation of a user of the mobile computing device.

14. The method of claim 13, wherein the mode of transportation is determined based on a rate of travel of the mobile computing device.

15. The method of claim 13, wherein the mode of transportation is determined by correlating the position of the mobile computing device to a database of geographical information.

16. The method of claim 9, wherein the access limit to the user-specific data is configurable by a user of the mobile computing device.

17. A non-transitory computer-readable medium storing instructions that, when executed by one or more processors, causes the one or more processors to:
access data indicating a current position of a mobile computing device and a prospective position of the mobile computing device;
providing user-specific data, stored in a memory of the mobile computing device, to one or more servers by implementing an access limit so that at least some of the user-specific data is prevented from being provided to the one or more servers;
receiving, from the one or more servers, advertisement data based on the current and prospective positions of the mobile computing device and the provided user-specific data; and
wherein the prospective position of the mobile computing device is determined based on a rate of travel of the mobile computing device and a direction of the mobile computing device.

18. The non-transitory computer-readable medium of claim 17, wherein the user-specific data includes data associated with at least one of a date stored in the memory and data provided by an address book of the mobile computing device.

19. The non-transitory computer-readable medium of claim 17, wherein the instructions further cause the one or more processors to provide a historical record of the mobile computing device to the one or more servers, the historical record including a record of at least one of a historical rate of travel of the mobile computing device and a historical position of the mobile computing device, wherein the advertisement data provided by the one or more servers is based on the historical record.

20. The non-transitory computer-readable medium of claim 17, wherein the instructions further cause the one or more processors to display a graphic feature corresponding to the advertisement data on a display device of the mobile computing device.

21. The non-transitory computer-readable medium of claim 17, wherein the advertisement data provided by the one or more servers is based on a mode of transportation of a user of the mobile computing device.

22. The non-transitory computer-readable medium of claim 21, wherein the mode of transportation is determined based on a rate of travel of the mobile computing device.

23. The non-transitory computer-readable medium of claim 21, wherein the mode of transportation is determined by correlating the position of the mobile computing device to a database of geographical information.

24. The non-transitory computer-readable medium of claim 17, wherein the access limit to the user-specific data is configurable by a user of the mobile computing device.

* * * * *

UNITED STATES PATENT AND TRADEMARK OFFICE
CERTIFICATE OF CORRECTION

PATENT NO.         : 8,504,074 B2
APPLICATION NO.    : 12/324694
DATED              : August 6, 2013
INVENTOR(S)        : Edward T. Colligan et al.

Page 1 of 1

It is certified that error appears in the above-identified patent and that said Letters Patent is hereby corrected as shown below:

In the Claims

In column 19, line 7, in Claim 2, delete "date" and insert -- data --, therefor.

In column 19, line 53, in Claim 10, delete "date" and insert -- data --, therefor.

In column 20, line 35, in Claim 18, delete "date" and insert -- data --, therefor.

Signed and Sealed this
Third Day of December, 2013

Margaret A. Focarino
*Commissioner for Patents of the United States Patent and Trademark Office*